US011652505B2

(12) United States Patent
Chen

(10) Patent No.: US 11,652,505 B2
(45) Date of Patent: May 16, 2023

(54) RF SYSTEM AND ELECTRONIC DEVICE

(71) Applicant: GUANGDONG OPPO MOBILE TELECOMMUNICATIONS CORP., LTD., Guangdong (CN)

(72) Inventor: Xianlong Chen, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 187 days.

(21) Appl. No.: 17/148,333

(22) Filed: Jan. 13, 2021

(65) Prior Publication Data
US 2021/0218435 A1 Jul. 15, 2021

(30) Foreign Application Priority Data

Jan. 14, 2020 (CN) .......................... 202010038966.X
Jan. 19, 2020 (CN) .......................... 202010061588.7

(51) Int. Cl.
H04L 12/00 (2006.01)
H04B 1/44 (2006.01)
H04B 1/00 (2006.01)

(52) U.S. Cl.
CPC ............... *H04B 1/44* (2013.01); *H04B 1/006* (2013.01)

(58) Field of Classification Search
None
See application file for complete search history.

(56) References Cited

U.S. PATENT DOCUMENTS

| 9,172,441 | B2 | 10/2015 | Granger-Jones et al. |
| 11,405,059 | B2* | 8/2022 | Pehlke .................. H04B 1/006 |
| 2004/0038660 | A1 | 2/2004 | He et al. |
| 2010/0135193 | A1 | 6/2010 | Przadka |

(Continued)

FOREIGN PATENT DOCUMENTS

| CN | 101741441 A | 6/2010 |
| CN | 102904624 A | 1/2013 |

(Continued)

OTHER PUBLICATIONS

Chinese Office Action with English Translation for CN Application 202010038966.X dated Sep. 17, 2021. (6 pages).

(Continued)

*Primary Examiner* — Sai Aung
*Assistant Examiner* — Lionel Preval
(74) *Attorney, Agent, or Firm* — Young Basile Hanlon & MacFarlane, P.C.

(57) ABSTRACT

A radio frequency (RF) system and an electronic device are provided. The RF system includes an RF transceiver, an RF processing circuit coupled with the RF transceiver, a transfer switch module, a first antenna, a second antenna, a third antenna, and a fourth antenna. The RF processing circuit comprises a first transmit (TX) module, a second TX module, a first receive (RX) module, a second RX module, a first duplexer, a second duplexer, and a filtering module. The first antenna is used for transmission in a first low-band (LB) and primary reception in the first LB, the second antenna is used for transmission in a second LB and primary reception in the second LB, the third antenna is used for diversity reception in the second LB, the fourth antenna is used for diversity reception in the first LB.

20 Claims, 16 Drawing Sheets

(56) References Cited

U.S. PATENT DOCUMENTS

| | | | | |
|---|---|---|---|---|
| 2014/0227982 | A1* | 8/2014 | Granger-Jones | H04B 1/006 455/77 |
| 2016/0374108 | A1 | 12/2016 | Lee et al. | |
| 2020/0076565 | A1* | 3/2020 | Lan | H04B 1/525 |
| 2020/0313714 | A1* | 10/2020 | Ono | H04B 1/40 |

FOREIGN PATENT DOCUMENTS

| | | |
|---|---|---|
| CN | 105871399 A | 8/2016 |
| CN | 207427152 U | 5/2018 |
| CN | 108199725 A | 6/2018 |
| CN | 108199728 A | 6/2018 |
| CN | 108322227 A | 7/2018 |
| CN | 108494461 A | 9/2018 |
| CN | 108540147 A | 9/2018 |
| CN | 109743072 A | 5/2019 |
| CN | 110545112 A | 12/2019 |
| CN | 110635821 A | 12/2019 |
| KR | 20170058511 A | 5/2017 |
| WO | 2014002703 A1 | 1/2014 |

OTHER PUBLICATIONS

Chinese First Office Action with English Translation for CN Application 202010038966.X dated Mar. 26, 2021. (19 pages).

Extended European Search Report for EP Application 21151428.6 dated Jun. 2, 2021. (7 pages).

Chinese First Office Action with English Translation for CN Application 202010061588.7 dated Apr. 15, 2021. (23 pages).

Chinese Second Office Action with English Translation for CN Application 202010061588.7 dated Jun. 9, 2021. (19 pages).

International Search Report for International Application PCT/CN2021/071721 dated Mar. 29, 2021. (10 pages).

* cited by examiner

RF SYSTEM AND ELECTRONIC DEVICE

CROSS-REFERENCE TO RELATED APPLICATION(S)

This application claims priority to Chinese Patent Application No. 202010038966.X, filed on Jan. 14, 2020, and Chinese Patent Application No. 202010061588.7, filed on Jan. 19, 2020, the entire disclosures of which are hereby incorporated by reference.

TECHNICAL FIELD

This disclosure relates to the technical field of radio frequency (RF) and particularly to an RF system and an electronic device.

BACKGROUND

With the widespread use of electronic devices such as smart phones, the smart phone can support an increasing number of applications and is becoming more and more powerful. The smart phone is developing in a diversified and personalized way, becoming an indispensable electronic product in users' life. Electronic devices in the fourth-generation (4G) mobile communication system generally adopt a single-antenna or dual-antenna RF system architecture. The RF architecture of 4G scheme is relatively simple, including transmit (TX) devices, receive (RX) devices, transfer switches, and antennas. The TX device may include a low-band (LB) TX module and a middle-high-band (MHB) TX module. The RX device may include a primary receive (PRX) module and a diversity receive (DRX) module. The RX path between the PRX module, the transfer switch, and the antenna is a PRX path, and the RX path between the DRX module, the transfer switch, and the antenna is a DRX path. The transfer switch can be switched intelligently between the PRX path and the DRX path. Currently, the 4G RF structure can only achieve transmission and reception in a single LB.

SUMMARY

Implementations of this application provide an RF system and an electronic device, where four antennas are adopted to support dual connection of a first LB and a second LB, and uplink signals are distributed on two antennas with better antenna efficiency, to ensure reliability of the uplink signals.

In a first aspect, implementations provide an RF system. The RF system includes an RF transceiver, an RF processing circuit coupled with the RF transceiver, a transfer switch module, a first antenna, a second antenna, a third antenna, and a fourth antenna.

The RF processing circuit includes a first transmit (TX) module, a second TX module, a first receive (RX) module, a second RX module, a first duplexer, a second duplexer, and a filtering module.

The first TX module is coupled with the transfer switch module through the first duplexer. The second TX module is coupled with the transfer switch module. The first RX module has a first RX port coupled with the transfer switch module through the first duplexer. The first RX module has a second RX port coupled with the transfer switch module through the second duplexer and the second TX module. The first RX module has a third RX port coupled with the transfer switch module through the second TX module. The second RX module has a first RX port coupled with the transfer switch module. The second RX module has a second RX port coupled with the filtering module or coupled with the transfer switch module through the filtering module.

The first antenna and the second antenna are coupled with the transfer switch module. The third antenna is coupled with the transfer switch module or the filtering module. The fourth antenna is coupled with the transfer switch module or the filtering module. Antenna efficiency of the first antenna and the second antenna is higher than that of the third antenna and the fourth antenna.

The first antenna is used for transmission in a first LB and primary reception in the first LB, the second antenna is used for transmission in a second LB and primary reception in the second LB, the third antenna is used for diversity reception in the second LB, the fourth antenna is used for diversity reception in the first LB, and the filtering module is configured to filter out bands other than the first LB, when the RF system works in a non-standalone (NSA) mode.

In a second aspect, implementations provide an electronic device. The electronic device includes the RF system of the first aspect and a mainboard. The RF transceiver, the RF processing circuit, and the transfer switch module are disposed on the mainboard. When the RF system works in the NSA mode, the RF system is configured to implement transmission and reception in the first LB and transmission and reception in the second LB.

BRIEF DESCRIPTION OF DRAWINGS

To describe technical solutions in implementations of the present disclosure more clearly, the following briefly introduces accompanying drawings required for illustrating the implementations. Apparently, the accompanying drawings in the following description illustrate some implementations of the present disclosure. Those of ordinary skill in the art may also obtain other drawings based on these accompanying drawings without creative efforts.

DETAILED DESCRIPTION

Technical solutions in implementations of the present disclosure will be described clearly and completely hereinafter with reference to the accompanying drawings described. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used for distinguishing between different objects rather than describing a particular order. The terms "include", "comprise", and "have" as well as variations thereof are intended to cover non-exclusive inclusion. For example, a process, system, product, or apparatus including a series of steps or units is not limited to the listed steps or units, it can optionally include other steps or units that are not listed; alternatively, other steps or units inherent to the process, product, or device can be included either.

The term "implementation" referred to herein means that a particular feature, structure, or feature described in connection with the implementation may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

The electronic device involved in the implementations of the present disclosure may include various handheld devices, in-vehicle devices, wearable devices, computing devices that have wireless communication functions or other processing devices connected to the wireless modem, as well as various forms of user equipment (UE) (such as mobile phones), mobile stations (MS), terminal devices, and the like. For the convenience of description, the above-mentioned devices are collectively referred to as an electronic device.

Figure 1:
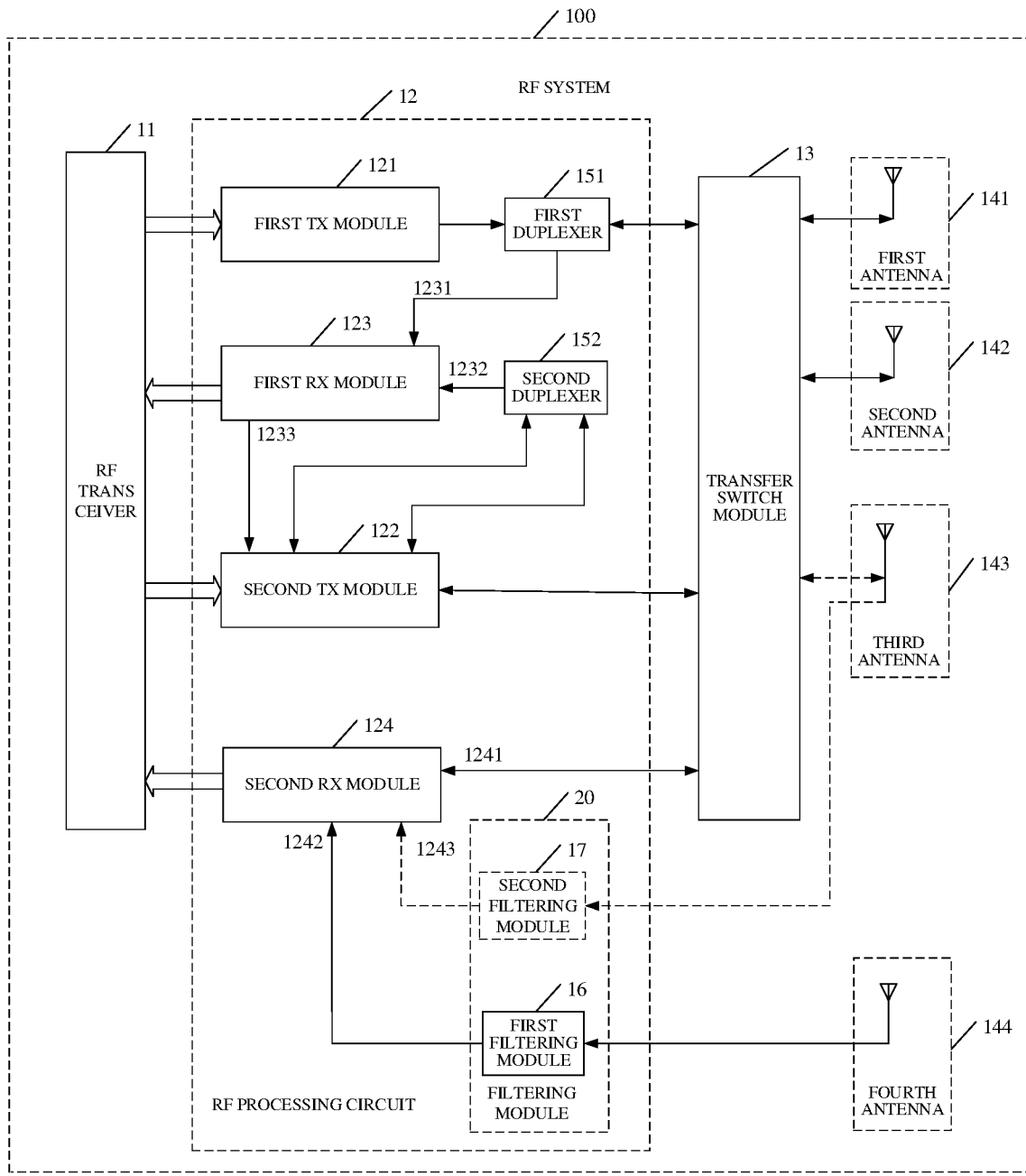
FIG. 1 is a schematic structural diagram illustrating an RF system according to implementations.

FIG. 1 is a schematic structural diagram illustrating an RF system according to implementations. As illustrated in FIG. 1, the RF system 100 includes an RF transceiver 11, an RF processing circuit 12 coupled with the RF transceiver 11, a transfer switch module 13, a first antenna 141, a second antenna 142, a third antenna 143, and a fourth antenna 144.

The RF processing circuit 12 includes a first TX module 121, a second TX module 122, a first RX module 123, a second RX module 124, a first duplexer 151, a second duplexer 152, and a filtering module 20.

The first TX module 121 is coupled with the transfer switch module 13 through the first duplexer 151. The second TX module 122 is coupled with the transfer switch module 13. The first RX module 123 has a first RX port 1231 coupled with the transfer switch module 13 through the first duplexer 151. The first RX module 123 has a second RX port 1232 coupled with the transfer switch module 13 through the second duplexer 152 and the second TX module 122. The first RX module 123 has a third RX port 1233 coupled with the transfer switch module 13 through the second TX module 122. The second RX module 124 has a first RX port 1241 coupled with the transfer switch module 13. The second RX module 124 has a second RX port 1242 coupled with the filtering module 20 or coupled with the transfer switch module 13 through the filtering module 20.

The first antenna 141 and the second antenna 142 are coupled with the transfer switch module 13. The third antenna 143 is coupled with the transfer switch module 13 or the filtering module 20. The fourth antenna 144 is coupled with the transfer switch module 13 or the filtering module 20. Antenna efficiency of the first antenna 141 and the second antenna 142 is higher than that of the third antenna 143 and the fourth antenna 144.

The filtering module 20 can include a first filtering module 16 or include the first filtering module 16 and a second filtering module 17.

In at least one implementation, the first filtering module 16 is embodied as a first filter 161.

In detail, the first TX module 121 is coupled with the first antenna 141 through the first duplexer 151 and the transfer switch module 13. The second TX module 122 is coupled with the second antenna 142 through the transfer switch module 13. The first RX port 1231 of the first RX module 123 is coupled with the first antenna 141 through the first duplexer 151 and the transfer switch module 13. The second RX port 1232 of the first RX module 123 is coupled with the second antenna 142 through the second duplexer 152, the second TX module 122, and the transfer switch module 13. The third RX port 1233 of the first RX module 123 is coupled with the second antenna 142 through the second TX module 122 and the transfer switch module 13. The first RX port 1241 of the second RX module 124 is coupled with the second antenna 142 through the transfer switch module 13. The second RX port 1242 of the second RX module 124 is coupled with the fourth antenna 144 through the first filter 161. The second RX module 124 is coupled with the third antenna 143 through the transfer switch module 13 or the second filtering module 17. Antenna efficiency of the first antenna 141 and the second antenna 142 is higher than that of the third antenna 143 and the fourth antenna 144.

The first antenna 141 is used for transmission in a first LB and primary reception in the first LB, the second antenna 142 is used for transmission in a second LB and primary reception in the second LB, the third antenna 143 is used for diversity reception in the second LB, the fourth antenna 144 is used for diversity reception in the first LB, and the first filter is configured to filter out bands other than the first LB, when the RF system 100 works in a non-standalone (NSA) mode.

In implementations of this application, the NSA mode includes any one of EN-DC, NE-DC, and NGEN-DC architectures.

Under the EN-DC architecture, the electronic device is connected to the 4G core network, the 4G base station is the primary station, and the 5G base station is the secondary station.

Under the NE-DC architecture, the 5G core network is introduced, the 5G base station is the primary station, and the 4G base station is the secondary station.

Under the NGEN-DC architecture, the 5G core network is introduced, the 4G base stations is the primary station, and the 5G base stations is the secondary station.

"DC" stands for dual connectivity; "E" stands for evolved universal mobile telecommunications system (UMTS) terrestrial radio access (evolved-UMTS terrestrial radio access, E-UTRA, or EUTRA), that is, the 4G wireless access network; "N" stands for new radio (NR), that is, the 5G NR; "NG" stands for next generation core network, that is, the 5G core network.

"EN-DC" refers to dual connection of 4G wireless access network and 5G NR. "NE-DC" refers to dual connection of 5G NR and 4G wireless access network. "NGEN-DC" refers to dual connection of 4G wireless access network and 5G NR under the 5G core network.

For the convenience of explanation, the following illustrates a case where the NSA mode includes the EN-DC architecture.

Under the EN-DC architecture, the RF system in the implementation supports LB+LB NSA. "LB+LB NSA" refers to simultaneous working of LB LTE (long term evolution)+LB NR, which requires two power amplifiers (PA) to work simultaneously for signal transmission. Furthermore, LB LTE and LB NR both need two antennas, where one antenna is used for transmit (TX) or primary receive (PRX) and the other antenna is used for diversity receive (DRX). Therefore, to realize LB+LB NSA, four antennas are required. The LB antenna is large in size, in contrast, for small-sized electronic devices (for example, mobile phones), the clearance area reserved for the LB antenna is small, which may be not big enough to accommodate four LB antennas. Therefore, it is difficult to arrange four LB antennas with good antenna efficiency in the small-sized electronic device. In order to ensure reliability of uplink signals, two antennas with better antenna efficiency among the four antennas can be used for transmission of LB LTE signals and LB NR signals.

In the implementation of this application, the first LB may include a 4G band, for example, B20 band (uplink: 832-862 MHz and downlink: 791-821 MHz); the second LB may include a 5G band, for example, N8 band (uplink: 880-915 MHz and downlink: 925-960 MHz) or N28 band (uplink: 703-748 MHz and downlink: 758-803 MHz). It should be noted that the frequency range of B8 in the 4G band is the same as that of N8 in the 5G band, and the frequency range of B28 in the 4G band is the same as that of N28 in the 5G band.

Under the EN-DC architecture, the first antenna 141 is used for transmission in the first LB and primary reception in the first LB, the second antenna 142 is used for transmission in the second LB and primary reception in the second LB, the third antenna 143 is used for diversity reception in the second LB, the fourth antenna 144 is used for diversity reception in the first LB. For example, the first antenna 141 is used for transmission in the B20 band and primary reception in the B20 band, the second antenna 142 is used for transmission in the N8 band or the N28 band and primary reception in the N8 band or the N28 band, the third antenna 143 is used for diversity reception in the N8 band or the N28 band, the fourth antenna 144 is used for diversity reception in the B20 band.

In the implementation, a TX path in the first LB includes: the RF transceiver 11→the first TX module 121→the first duplexer 151→the transfer switch module 13→the first antenna 141.

A PRX path in the first LB includes: the first antenna 141→the transfer switch module 13→the first duplexer 151→the first RX module 123→the RF transceiver 11.

A DRX path in the first LB includes: the fourth antenna 144→the first filter 161→the second RX module 124→the RF transceiver 11.

A TX path in the second LB includes: the RF transceiver 11→the second TX module 122→the second duplexer 152→the second TX module 122→the transfer switch module 13→the second antenna 142, or includes: the RF transceiver 11→the second TX module 122→the transfer switch module 13→the second antenna 142.

A PRX path in the second LB includes: the second antenna 142→the transfer switch module 13→the second TX module 122→the second duplexer 152→the first RX module 123→the RF transceiver 11, or includes: the second antenna 142→the transfer switch module 13→the second TX module 122→the first RX module 123→the RF transceiver 11.

A DRX path in the second LB includes: the third antenna 143→the transfer switch module 13→the second RX module 124→the RF transceiver 11, or includes: the third antenna 143→the second filtering module 17→the second RX module 124→the RF transceiver 11.

The RF path in the first LB includes: a TX path in the first LB, a PRX path in the first LB, and a DRX path in the first LB. The RF path in the second LB includes: a TX path in the second LB, a PRX path in the second LB, and a DRX path in the second LB.

The RF path in the first LB (for example, LB LTE band) only circulates TX signals, PRX signals, and DRX signals. The RF path in the second LB (for example, LB NR band) circulates TX signals, PRX signals, DRX signals, multiple-input multiple-output PRX (MIMO PRX) signals, and MIMO DRX signals.

In at least one example, the first duplexer 151 may allow simultaneous transmission and primary reception in the first LB. The second duplexer 152 may allow simultaneous transmission and primary reception in the second LB.

In at least one example, the RF transceiver 11 may include a wafer transceiver (WTR). The first TX module 121 may include a multi-mode multi-band PA (MMPA), where a PA, a switch, and the like can be integrated into the MMPA. The MMPA in the implementation can increase LTE transmit power in the NSA.

In at least one example, the second TX module 122 may include a PA with antenna switch module and filter and duplexer (PAMID), where the PAMID is an RF integrated module that integrates a PA, a duplexer, a filter, and a switch.

In at least one example, the first RX module 123 may include a micro low noise amplifier (MLNA), where the MLNA can integrate a low noise amplifier (LNA) and is used for amplifying RX signals.

In at least one example, the PAMID and the MLNA can be replaced with the Phase7 lite device, or with MMPA operable in NR, which is not limited herein.

In at least one example, the second RX module 124 may an L-DRX (LTE-discontinuous receive), where the L-DRX is an RX module that integrates a surface acoustic wave (SAW) filter and an LNA and is used for filtering and amplifying RX signals.

In at least one example, the L-DRX can be replaced with the Phase7 lite device, or with DFEM and MLNA, or with switch and SAW and MLNA, which is not limited herein.

In at least one example, the transfer switch module 13 may include at least one of a dual-pole double-throw (DPDT) switch, a triple-pole triple-throw (3P3T) switch, a DP3T switch, a dual-pole quad-throw (DP4T) switch, and a single-pole double-throw (SPDT) switch. The DPDT switch, the 3P3T switch, the DP3T switch, the DP4T switch, and the SPDT switch are all full-coupling switches.

The DPDT switch can include 2 input (IN) ports and 2 output (OUT) ports, which can realize switching between connections achieved through the 2 IN ports and the 2 OUT ports. The 3P3T switch can include 3 IN ports and 3 OUT ports, which can realize switching between connections achieved through the 3 IN ports and the 3 OUT ports. The DP4T switch can include 4 IN ports and 2 OUT ports, which can realize switching between connections achieved through the 4 IN ports and the 2 OUT ports. The SPDT switch can include 1 IN port and 2 OUT ports, which can realize switching between connections achieved through the 1 IN port and the 2 OUT ports.

According to the implementations, four antennas are adopted to support dual connection of the first LB and the second LB, to achieve simultaneous transmission and reception in the first LB and in the second LB, and uplink signals are distributed on two antennas with better antenna efficiency, to ensure reliability of the uplink signals.

In at least one implementation, the second LB includes a first sub-band or a second sub-band.

The first LB and the second LB are different in frequency range. For example, the first LB is the B20 band (uplink: 832-862 MHz and downlink: 791-821 MHz), where the first sub-band is the N8 band (uplink: 880-915 MHz and downlink: 925-960 MHz) or B8 band and the second sub-band is the N28 band (uplink: 703-748 MHz and downlink: 758-803 MHz) or B28 band.

In an example, in the NSA mode, the first LB is the B20 band, where the first sub-band is the N8 band, and the second sub-band is the N28 band. In the 4G mode, the first LB is the B20 band, where the first sub-band is the B8 band, and the second sub-band is the B28 band.

In at least one implementation, when the RF system 100 works or operates in the 4G mode, the first antenna 141 is used for transmission in the first LB and primary reception in the first LB and is further used for transmission in the second LB and primary reception in the second LB and the second antenna 142 is used for diversity reception in the first LB or the second LB.

In the implementation, the first LB may include a 4G band, for example, the B20 band (uplink: 832-862 MHz and downlink: 791-821 MHz) and the second LB may include a 4G band, for example, the B8 band (uplink: 880-915 MHz and downlink: 925-960 MHz) or the B28 band (uplink: 703-748 MHz and downlink: 758-803 MHz). It should be noted that the frequency range of B8 in the 4G band is the same as that of N8 in the 5G band, and the frequency range of B28 in the 4G band is the same as that of N28 in the 5G band.

In the implementation, when the RF system 100 works in the 4G mode, the third antenna 143 and the fourth antenna 144 in the RF system 100 are not used or only used for reception or receive (RX) in LB, to achieve 4RX/4×4 MIMO function.

In the implementation, a TX path in the first LB includes: the RF transceiver 11→the second TX module 122→the transfer switch module 13→the first antenna 141.

A PRX path in the first LB includes: the first antenna 141→the transfer switch module 13→the second TX module 122→the first RX module 123→the RF transceiver 11.

A DRX path in the first LB includes: the second antenna 142→the transfer switch module 13→the second RX module 124→the RF transceiver 11.

A TX path in the second LB includes: the RF transceiver 11→the second TX module 122→the second duplexer 152→the second TX module 122→the transfer switch module 13→first antenna 141, or includes: the RF transceiver 11→the second TX module 122→the transfer switch module 13→the first antenna 141.

A PRX path in the second LB includes: the first antenna 141→the transfer switch module 13→the second TX module 122→the second duplexer 152→the first RX module 123→the RF transceiver 11, or includes: the first antenna 141→the transfer switch module 13→the second TX module 122→the first RX module 123→the RF transceiver 11.

A DRX path in the second LB includes: the second antenna 142→the transfer switch module 13→the second RX module 124→the RF transceiver 11.

The RF path in the first LB includes: a TX path in the first LB, a PRX path in the first LB, and a DRX path in the first LB. The RF path in the second LB includes: a TX path in the second LB, a PRX path in the second LB, and a DRX path in the second LB.

The transfer switch module 13 can include one transfer switch or two transfer switches.

In at least one implementation, when the transfer switch module 13 includes one transfer switch, the transfer switch includes a dual-pole triple-throw (DP3T) switch, a 3P3T switch, or a DP4T switch.

In at least one implementation, when the transfer switch 13 includes the DP3T switch or the DP4T switch, the filtering module 20 includes the first filtering module 16 and the second filtering module 17 and the second RX module 124 has a third RX port 1243 coupled with the second filtering module 17.

Figure 2:
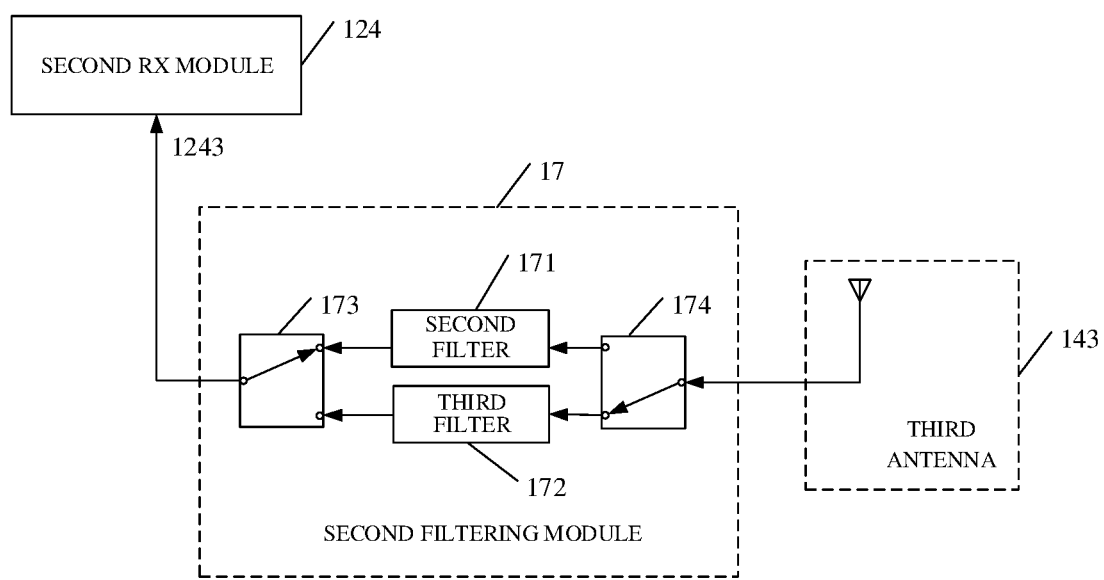
FIG. 2 is a schematic structural diagram illustrating a second filtering module according to implementations.

FIG. 2 is a schematic structural diagram illustrating a second filtering module according to implementations. As illustrated in FIG. 2, the second filtering module 17 includes a second filter 171, a third filter 172, a first SPDT switch 173, and a second SPDT switch 174. The first SPDT switch 173 has a P port coupled with the third RX port 1243 of the second RX module 124. The first SPDT switch 173 has a first T port coupled with a first end of the second filter 171. The first SPDT switch 173 has a second T port coupled with a first end of the third filter 172. The second filter 171 has a second end coupled with a first T port of the second SPDT switch 174. The third filter 172 has a second end coupled with a second T port of the second SPDT switch 174. The second SPDT switch 174 has a P port coupled with the third antenna 143.

The second filter 171 is configured to filter out bands other than the first sub-band and the third filter 172 is configured to filter out bands other than the second sub-band.

Figure 3A:
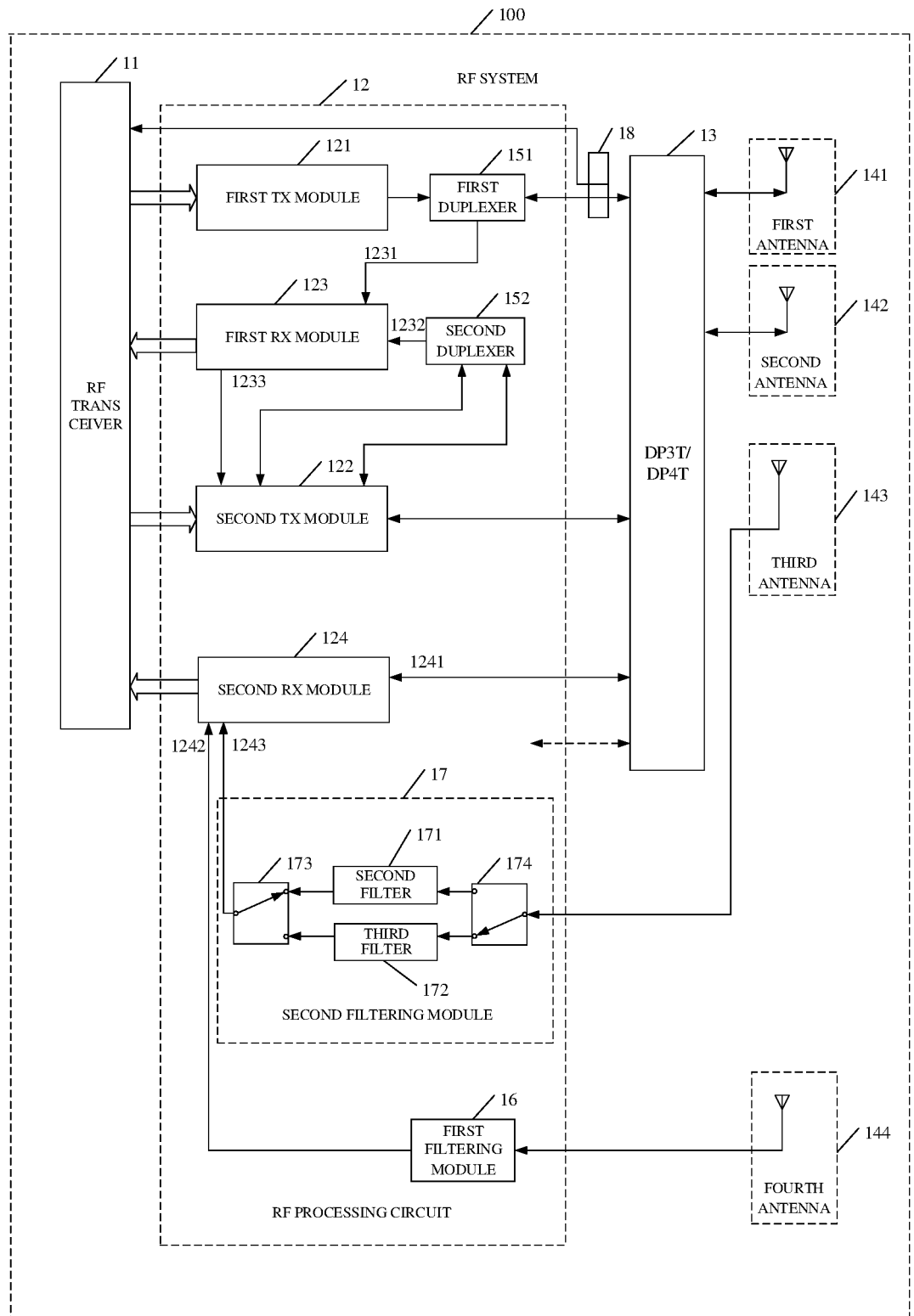
FIG. 3a is a schematic structural diagram illustrating an RF system where a transfer switch module of the RF system is a dual-pole triple-throw (DP3T) switch or a dual-pole quad-throw (DP4T) switch according to implementations.

FIG. 3a is a schematic structural diagram illustrating an RF system where a transfer switch module of the RF system is a DP3T switch or a DP4T switch according to implementations. As illustrated in FIG. 3a, the RF system 100 includes an RF transceiver 11, an RF processing circuit 12 coupled with the RF transceiver 11, a DP3T switch 13, a first antenna 141, a second antenna 142, a third antenna 143, a fourth antenna 144, and a directional coupler 18.

The RF processing circuit 12 includes a first TX module 121, a second TX module 122, a first RX module 123, a second RX module 124, a first duplexer 151, a second duplexer 152, a first filtering module 16 (embodied as a first filter 161), and a second filtering module 17.

The first TX module 121 is coupled with the first antenna 141 through the first duplexer 151, the directional coupler 18, and the DP3T switch 13. The second TX module 122 is coupled with the second antenna 142 through the DP3T switch 13. The first RX module 123 has a first RX port 1231 coupled with the first antenna 141 through the first duplexer 151, the directional coupler 18, and the DP3T switch 13. The first RX module 123 has a second RX port 1232 coupled with the second antenna 142 through the second duplexer 152, the second TX module 122, and the DP3T switch 13. The first RX module 123 has a third RX port 1233 coupled with the second antenna 142 through the second TX module 122 and the DP3T switch 13. The second RX module 124 has a first RX port 1241 coupled with the second antenna 142 through the DP3T switch 13. The second RX module 124 has a second RX port 1242 coupled with the fourth antenna 144 through the first filter 161. The second RX module 124 is coupled with the third antenna 143 through the second filtering module 17. Antenna efficiency of the first antenna 141 and the second antenna 142 is higher than that of the third antenna 143 and the fourth antenna 144.

When the RF system 100 works in the NSA mode, the first antenna 141 is used for transmission in the first LB and primary reception in the first LB, the second antenna 142 is used for transmission in the second LB and primary reception in the second LB, the third antenna 143 is used for diversity reception in the second LB, the fourth antenna 144 is used for diversity reception in the first LB, and the first filter 161 is configured to filter out bands other than the first LB. That is, the first filter 161 can reserve the first LB and filter out other bands.

The second filtering module 17 includes a second filter 171, a third filter 172, a first SPDT switch 173, and a second SPDT switch 174. The first SPDT switch 173 has a P port coupled with the third RX port 1243 of the second RX module 124. The first SPDT switch 173 has a first T port coupled with a first end of the second filter 171. The first SPDT switch 173 has a second T port coupled with a first end of the third filter 172. The second filter 171 has a second end coupled with a first T port of the second SPDT switch 174. The third filter 172 has a second end coupled with a second T port of the second SPDT switch 174. The second SPDT switch 174 has a P port coupled with the third antenna 143.

The second filter 171 is configured to filter out bands other than the first sub-band and the third filter 172 is configured to filter out bands other than the second sub-band. That is, the second filter 171 can keep the first sub-band and filter out bands other than the first sub-band and the third filter 172 can keep the second sub-band and filter out bands other than the second sub-band.

When the RF system 100 works in the NSA mode, the following illustrates an example where the first LB is the B20 band, the first sub-band is the N8 band, and the second sub-band is the N28A band. The N28A band is a part of the N28 band, and the N28 band includes the N28A band and the N28B band.

The signal flow direction (signal flow for short) under B20+N28A EN-DC is described as follows.

TX in the B20 band: the RF transceiver 11 (for example, WTR)→the first TX module 121 (for example, MMPA)→the first duplexer 151 (for example, B20 duplexer)→the directional coupler 18→the DP3T switch 13→the first antenna 141.

PRX in the B20 band: the first antenna 141→the DP3T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the first filter 161 (for example: B20 SAW)→the second RX module 124 (for example, L-DRX)→the RF transceiver 11 (for example, WTR).

TX in the N28A band: the RF transceiver 11 (for example, WTR)→the second TX module 122 (for example, LB PAMID)→the second duplexer 152 (for example, N28A duplexer)→the second TX module 122 (for example, LB PAMID)→the DP3T switch 13→the second antenna 142.

PRX in the N28A band: the second antenna 142→the DP3T switch 13→the second TX module 122 (for example, LB PAMID)→the second duplexer 152 (for example, N28A duplexer)→the first RX module 123 (for example, MLNA)→the RF transceiver 11 (for example, WTR).

DRX in the N28A band: the third antenna 143→the second SPDT switch 174→the third filter 172 (for example: N28 SAW)→the first SPDT switch 173→the second RX module 124 (for example, L-DRX)→the RF transceiver 11 (for example, WTR).

The signal flow under B20+N8 EN-DC is described as follows.

TX in the B20 band: the RF transceiver 11 (for example, WTR)→the first TX module 121 (for example, MMPA)→the first duplexer 151 (for example, B20 duplexer)→the directional coupler 18→the DP3T switch 13→the first antenna 141.

PRX in the B20 band: the first antenna 141→the DP3T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the first filter 161 (for example: B20 SAW)→the second RX module 124 (for example, L-DRX)→the RF transceiver 11 (for example, WTR).

TX in the N8 band: the RF transceiver 11 (for example, WTR)→the second TX module 122 (for example, LB PAMID)→the DP3T switch 13→the second antenna 142.

PRX in the N8 band: the second antenna 142→the DP3T switch 13→the second TX module 122 (for example, LB PAMID)→the first RX module 123 (for example, MLNA)→the RF transceiver 11 (for example, WTR).

DRX in the N8 band: the third antenna 143→the second SPDT switch 174→the second filter 171 (for example: N8 SAW)→the first SPDT switch 173→the second RX module 124 (for example, L-DRX)→the RF transceiver 11 (for example, WTR).

The directional coupler 18 of the implementation can mix two RF signals to output. In an example, the directional coupler 18 can also have a function of power allocation, which is used to divide power of an input signal into multiple ways and feed them back to corresponding RX ports of the RF transceiver 11, so that the RF transceiver 11 can adjust the power of the RF signal it transmits.

In at least one implementation, when the RF system 100 works in the 4G mode, the first antenna 141 is used for transmission in the first LB and primary reception in the first LB and is further used for transmission in the second LB and primary reception in the second LB and the second antenna 142 is used for diversity reception in the first LB or the second LB.

When the RF system 100 works in the 4G mode, the following describes an example where the first LB is the B20 band, the first sub-band is the B8 band, and the second sub-band is the B28A band. The B28A band is a part of the B28 band, and the B28 band includes the B28A band and the B28B band.

The signal flow in the RF system 100 working in the 4G mode is as follows.

TX in the B28A band: the RF transceiver 11 (for example, WTR)→the second TX module 122 (for example, LB PAMID)→the second duplexer 152 (for example, B28A duplexer)→the second TX module 122 (for example, LB PAMID)→the DP3T switch 13→the first antenna 141.

TX in the B20/B8 band: the RF transceiver 11 (for example, WTR)→the second TX module 122 (for example, LB PAMID)→the DP3T switch 13 the first antenna 141.

PRX in the B28A band: the first antenna 141→the DP3T switch 13→the second TX module 122 (for example, LB PAMID)→the second duplexer 152 (for example, B28A duplexer)→the first RX module 123 (for example, MLNA)→the RF transceiver 11 (for example, WTR).

PRX in the B20/B8 band: the first antenna 141→the DP3T switch 13→the second TX module 122 (for example, LB PAMID)→the first RX module 123 (for example, MLNA)→the RF transceiver 11 (for example, WTR).

DRX in the B8/B20/B28: the second antenna 142→the DP3T switch 13→the second RX module 124 (for example, L-DRX)→the RF transceiver 11 (for example, WTR).

In at least one implementation, when the transfer switch includes the 3P3T switch, the second RX module 124 is coupled with the third antenna 143 through the transfer switch module 13 or the second filtering module 17 as follows.

The first RX port of the second RX module 124 is coupled with the third antenna 143 through the transfer switch module 13.

Figure 3B:
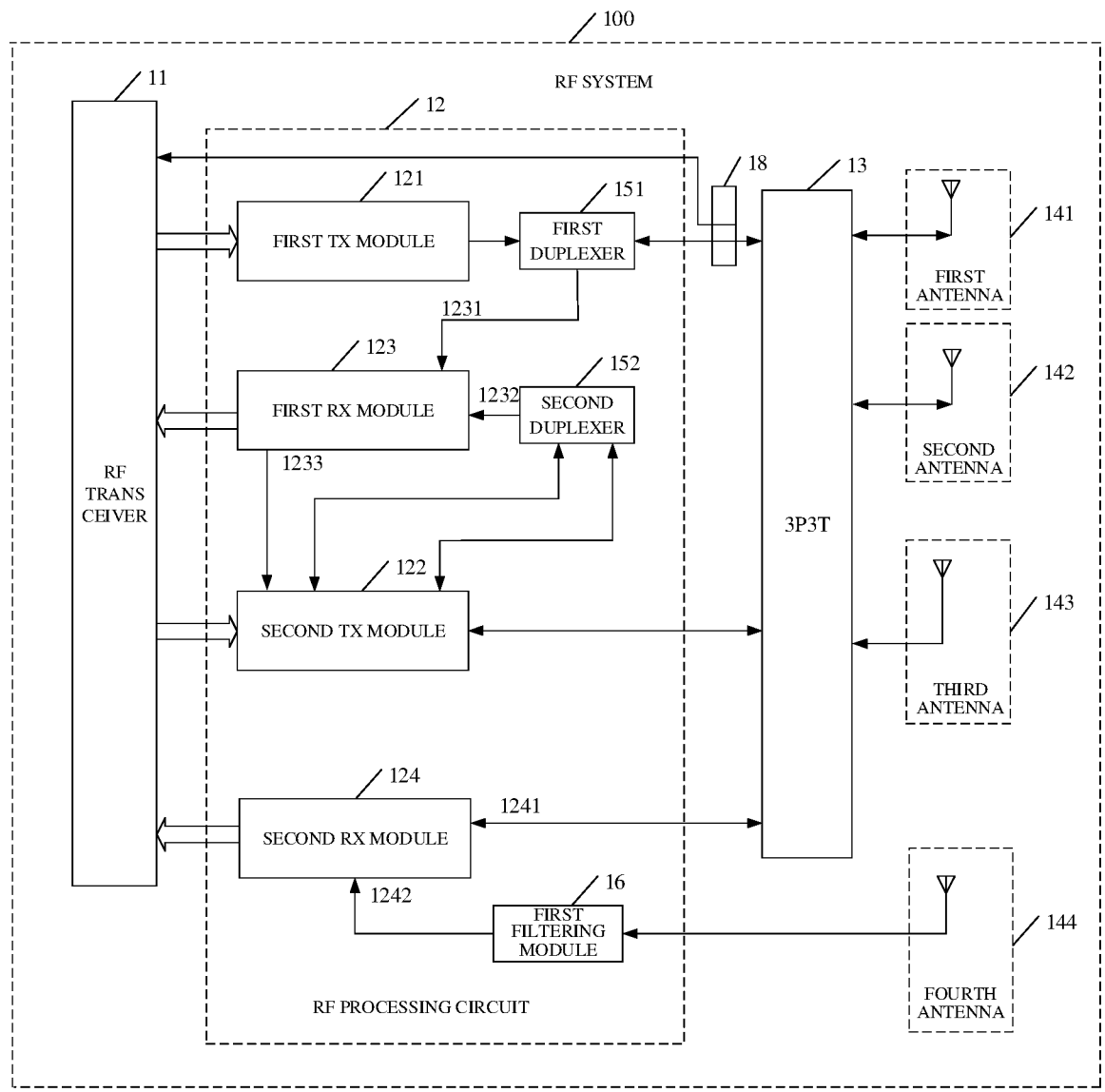
FIG. 3b is a schematic structural diagram illustrating an RF system where a transfer switch module of the RF system is a triple-pole triple-throw (3P3T) switch according to implementations.

FIG. 3b is a schematic structural diagram illustrating an RF system where a transfer switch module of the RF system is a 3P3T switch according to implementations. As illustrated in FIG. 3b, the RF system 100 includes an RF transceiver 11, an RF processing circuit 12 coupled with the RF transceiver 11, a 3P3T switch 13, a first antenna 141, a second antenna 142, a third antenna 143, a fourth antenna 144, and a directional coupler 18.

The RF processing circuit 12 includes a first TX module 121, a second TX module 122, a first RX module 123, a second RX module 124, a first duplexer 151, a second duplexer 152, and a first filtering module 16 (embodied as a first filter 161).

The first TX module 121 is coupled with the first antenna 141 through the first duplexer 151, the directional coupler 18, and the 3P3T switch 13. The second TX module 122 is coupled with the second antenna 142 through the 3P3T switch 13. The first RX module 123 has a first RX port 1231 coupled with the first antenna 141 through the first duplexer 151, the directional coupler 18, and the 3P3T switch 13. The first RX module 123 has a second RX port 1232 coupled with the second antenna 142 through the second duplexer 152, the second TX module 122, and the 3P3T switch 13. The first RX module 123 has a third RX port 1233 coupled with the second antenna 142 through the second TX module 122 and the 3P3T switch 13. The second RX module 124 has a first RX port 1241 coupled with the second antenna 142 through the 3P3T switch 13. The second RX module 124 has a second RX port 1242 coupled with the fourth antenna 144 through the first filter 161. The second RX module 124 is coupled with the third antenna 143 through the 3P3T switch 13. Antenna efficiency of the first antenna 141 and the second antenna 142 is higher than that of the third antenna 143 and the fourth antenna 144.

When the RF system 100 works in the NSA mode, the first antenna 141 is used for transmission in the first LB and primary reception in the first LB, the second antenna 142 is used for transmission in the second LB and primary reception in the second LB, the third antenna 143 is used for diversity reception in the second LB, the fourth antenna 144 is used for diversity reception in the first LB, and the first filter 161 is configured to filter out bands other than the first LB. That is, the first filter 161 can keep the first LB and filter out other bands.

When the RF system 100 works in the NSA mode, the following illustrates an example where the first LB is the B20 band, the first sub-band is the N8 band, and the second sub-band is the N28A band. The N28A band is a part of the N28 band, and the N28 band includes the N28A band and the N28B band.

The signal flow under B20+N28A EN-DC is as follows.

TX in the B20 band: the RF transceiver 11 (for example, WTR)→the first TX module 121 (for example, MMPA)→the first duplexer 151 (for example, B20 duplexer)→the directional coupler 18→the 3P3T switch 13→the first antenna 141.

PRX in the B20 band: the first antenna 141→the 3P3T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the first filter 161 (for example: B20 SAW)→the second RX module 124 (for example, L-DRX)→the RF transceiver 11 (for example, WTR).

TX in the N28A band: the RF transceiver 11 (for example, WTR)→the second TX module 122 (for example, LB PAMID)→the second duplexer 152 (for example, B28A duplexer)→the second TX module 122 (for example, LB PAMID)→the 3P3T switch 13→the second antenna 142.

PRX in the N28A band: the second antenna 142→the 3P3T switch 13→the second TX module 122 (for example, LB PAMID)→the second duplexer 152 (for example, B28A duplexer)→the first RX module 123 (for example, MLNA)→the RF transceiver 11 (for example, WTR).

DRX in the N28A band: the third antenna 143→the 3P3T switch 13→the second RX module 124 (for example, L-DRX)→the RF transceiver 11 (for example, WTR).

The signal flow under B20+N8 EN-DC is as follows.

TX in the B20 band: the RF transceiver 11 (for example, WTR)→the first TX module 121 (for example, MMPA)→the first duplexer 151 (for example, B20 duplexer)→the directional coupler 18→the 3P3T switch 13→the first antenna 141.

PRX in the B20 band: the first antenna 141→the 3P3T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the first filter 161 (for example: B20 SAW)→the second RX module 124 (for example, L-DRX)→the RF transceiver 11 (for example, WTR).

TX in the N8 band: the RF transceiver 11 (for example, WTR)→the second TX module 122 (for example, LB PAMID)→the 3P3T switch 13→the second antenna 142.

PRX in the N8 band: the second antenna 142→the 3P3T switch 13→the second TX module 122 (for example, LB PAMID)→the first RX module 123 (for example, MLNA)→the RF transceiver 11 (for example, WTR).

DRX in the N8 band: the third antenna 143→the 3P3T switch 13→the second RX module 124 (for example, L-DRX)→the RF transceiver 11 (for example, WTR).

The directional coupler 18 of the implementation can mix two RF signals to output. In an example, the directional coupler 18 can also have a function of power allocation, which is used to divide power of an input signal into multiple ways and feed them back to corresponding RX ports of the RF transceiver 11, so that the RF transceiver 11 can adjust the power of the RF signal it transmits.

In at least one implementation, when the RF system 100 works in the 4G mode, the first antenna 141 is used for transmission in the first LB and primary reception in the first LB and is further used for transmission in the second LB and primary reception in the second LB and the second antenna 142 is used for diversity reception in the first LB or the second LB.

When the RF system 100 works in the 4G mode, the following describes an example where the first LB is the B20 band, the first sub-band is the B8 band, and the second sub-band is the B28A band. The B28A band is a part of the B28 band, and the B28 band includes the B28A band and the B28B band.

For the signal flow of the RF system 100 working in the 4G mode, reference can be made to the signal flow in the 4G mode illustrated in FIG. 3a, which is not repeated herein.

In at least one implementation, the transfer switch module 13 includes two transfer switches, and the two transfer switches include a first DPDT switch 131 and a second DPDT switch 132.

In at least one implementation, the first DPDT switch 131 has a first P port coupled with the first antenna 141. The first DPDT switch 131 has a second P port coupled with the third antenna 143. The first DPDT switch 131 has a first T port coupled with the first duplexer 151. The first DPDT switch 131 has a second T port coupled with a first P port of the second DPDT switch 132. The second DPDT switch 132 has a second P port coupled with the second antenna 142. The second DPDT switch 132 has a first T port coupled with the second TX module 122. The second DPDT switch 132 has a second T port coupled with the first RX port of the second RX module 124.

The first TX module 121 is coupled with the first antenna 141 through the first duplexer 151 and the transfer switch module 13 as follows.

The first TX module 121 is coupled with the first antenna 141 through the first duplexer 151 and the first DPDT switch 131.

The second TX module 122 is coupled with the second antenna 142 through the transfer switch module 13 as follows.

The second TX module 122 is coupled with the second antenna 142 through the second DPDT switch 132.

The first RX port of the first RX module 123 is coupled with the first antenna 141 through the first duplexer 151 and the transfer switch module 13 as follows.

The first RX port of the first RX module 123 is coupled with the first antenna 141 through the first duplexer 151 and the first DPDT switch 131.

The second RX port of the first RX module 123 is coupled with the second antenna 142 through the second duplexer, the second TX module 122, and the transfer switch module 13 as follows.

The second RX port of the first RX module 123 is coupled with the second antenna 142 through the second duplexer, the second TX module 122, and the second DPDT switch 132.

The third RX port of the first RX module 123 is coupled with the second antenna 142 through the second TX module 122 and the transfer switch module 13 as follows.

The third RX port of the first RX module 123 is coupled with the second antenna 142 through the second TX module 122 and the second DPDT switch 132.

The first RX port of the second RX module 124 is coupled with the second antenna 142 through the transfer switch module 13 as follows.

The first RX port of the second RX module 124 is coupled with the second antenna 142 through the second DPDT switch 132.

The second RX module 124 is coupled with the third antenna 143 through the transfer switch module 13 or the second filtering module as follows.

The first RX port of the second RX module 124 is coupled with the third antenna 143 through the second DPDT switch 132 and the first DPDT switch 131.

Figure 4A:
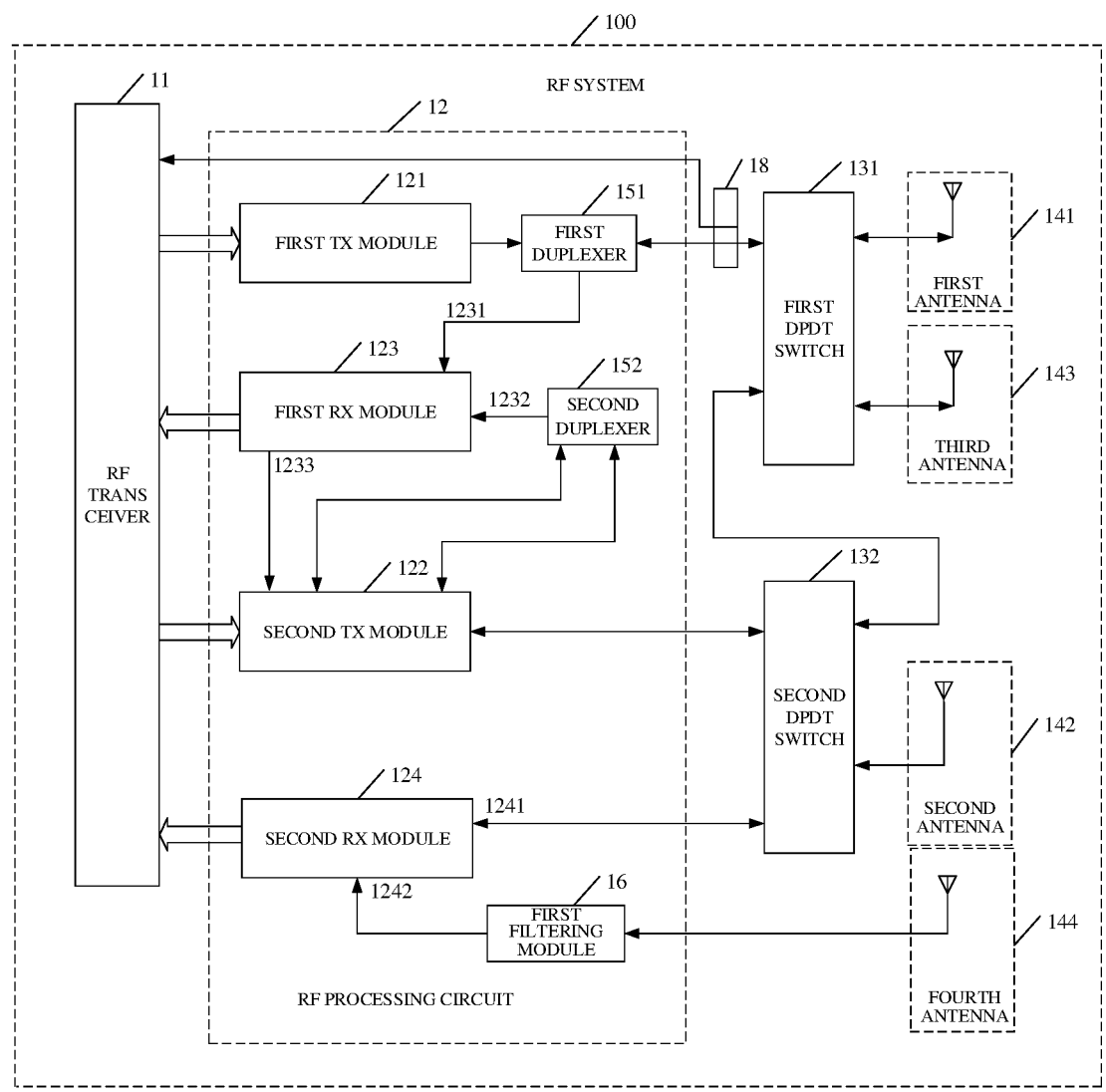
FIG. 4a is a schematic structural diagram illustrating an RF system where a transfer switch module of the RF system includes two transfer switches according to implementations.

FIG. 4a is a schematic structural diagram illustrating an RF system where a transfer switch module of the RF system includes two transfer switches according to implementations. As illustrated in FIG. 4a, the RF system 100 includes an RF transceiver 11, an RF processing circuit 12 coupled with the RF transceiver 11, a first DPDT switch 131 and a second DPDT switch 132, a first antenna 141, a second antenna 142, a third antenna 143, a fourth antenna 144, and a directional coupler 18.

The RF processing circuit 12 includes a first TX module 121, a second TX module 122, a first RX module 123, a second RX module 124, a first duplexer 151, a second duplexer 152, and a first filtering module 16 (embodied as a first filter 161).

The first TX module 121 is coupled with the first antenna 141 through the first duplexer 151, the directional coupler 18, and the first DPDT switch 131. The second TX module 122 is coupled with the second antenna 142 through the second DPDT switch 132. The first RX module 123 has a first RX port 1231 coupled with the first antenna 141 through the first duplexer 151, the directional coupler 18, and the first DPDT switch 131. The first RX module 123 has a second RX port 1232 coupled with the second antenna 142 through the second duplexer 152, the second TX module 122, and the second DPDT switch 132. The first RX module 123 has a third RX port 1233 coupled with the second antenna 142 through the second TX module 122 and the second DPDT switch 132. The second RX module 124 has a first RX port 1241 coupled with the second antenna 142 through the second DPDT switch 132. The second RX module 124 has a second RX port 1242 coupled with the fourth antenna 144 through the first filter 161. Antenna efficiency of the first antenna 141 and the second antenna 142 is higher than that of the third antenna 143 and the fourth antenna 144.

When the RF system 100 works in the NSA mode, the first antenna 141 is used for transmission in the first LB and primary reception in the first LB, the second antenna 142 is used for transmission in the second LB and primary reception in the second LB, the third antenna 143 is used for diversity reception in the second LB, the fourth antenna 144 is used for diversity reception in the first LB, and the first filter 161 is configured to filter out bands other than the first LB. That is, the first filter 161 can keep the first LB and filter out other bands.

When the RF system 100 works in the NSA mode, the following illustrates an example where the first LB is the B20 band, the first sub-band is the N8 band, and the second sub-band is the N28A band. The N28A band is a part of the N28 band, and the N28 band includes the N28A band and the N28B band.

The signal flow under B20+N28A EN-DC is as follows.

TX in the B20 band: the RF transceiver 11 (for example, WTR)→the first TX module 121 (for example, MMPA)→the first duplexer 151 (for example, B20 duplexer)→the directional coupler 18→the first DPDT switch 131→the first antenna 141.

PRX in the B20 band: the first antenna 141→the first DPDT switch 131→the directional coupler 18→the first duplexer (for example, B20 duplexer)→the first RX module 123 (for example, MLNA)→the RF transceiver 11 (for example, WTR).

DRX in the B20 band: the fourth antenna 144→the first filter 161 (for example: B20 SAW)→the second RX module 124 (for example, L-DRX)→the RF transceiver 11 (for example, WTR).

TX in the N28A band: the RF transceiver 11 (for example, WTR)→the second TX module 122 (for example, LB PAMID)→the second duplexer 152 (for example, N28A duplexer)→the second TX module 122 (for example, LB PAMID)→the second DPDT switch 132→the second antenna 142.

PRX in the N28A band: the second antenna 142→the second DPDT switch 132→the second TX module 122 (for example, LB PAMID)→the second duplexer 152 (for example, N28A duplexer)→the first RX module 123 (for example, MLNA)→the RF transceiver 11 (for example, WTR).

DRX in the N28A band: the third antenna 143→the first DPDT switch 131→the second DPDT switch 132→the second RX module 124 (for example, L-DRX)→the RF transceiver 11 (for example, WTR).

The signal flow under B20+N8 EN-DC is as follows.

TX in the B20 band: the RF transceiver 11 (for example, WTR)→the first TX module 121 (for example, MMPA)→the first duplexer 151 (for example, B20 duplexer)→the directional coupler 18→the first DPDT switch 131→the first antenna 141.

PRX in the B20 band: the first antenna 141→the first DPDT switch 131→the directional coupler 18→the first duplexer (for example, B20 duplexer)→the first RX module 123 (for example, MLNA)→the RF transceiver 11 (for example, WTR).

DRX in the B20 band: the fourth antenna 144→the first filter 161 (for example: B20 SAW)→the second RX module 124 (for example, L-DRX)→the RF transceiver 11 (for example, WTR).

TX in the N8 band: the RF transceiver 11 (for example, WTR)→the second TX module 122 (for example, LB PAMID)→the second DPDT switch 132→the second antenna 142.

PRX in the N8 band: the second antenna 142→the second DPDT switch 132→the second TX module 122 (for example, LB PAMID)→the first RX module 123 (for example, MLNA)→the RF transceiver 11 (for example, WTR).

DRX in the N8 band: the third antenna 143→the first DPDT switch 131→the second DPDT switch 132→the second RX module 124 (for example, L-DRX)→the RF transceiver 11 (for example, WTR).

The directional coupler 18 of the implementation can mix two RF signals to output. In an example, the directional coupler 18 can also have a function of power allocation, which is used to divide power of an input signal into multiple ways and feed them back to corresponding RX ports of the RF transceiver 11, so that the RF transceiver 11 can adjust the power of the RF signal it transmits.

In at least one implementation, when the RF system 100 works in the 4G mode, the first antenna 141 is used for transmission in the first LB and primary reception in the first LB and is further used for transmission in the second LB and primary reception in the second LB and the second antenna 142 is used for diversity reception in the first LB or the second LB.

When the RF system 100 works in the 4G mode, the following describes an example where the first LB is the B20 band, the first sub-band is the B8 band, and the second sub-band is the B28A band. The B28A band is a part of the B28 band, and the B28 band includes the B28A band and the B28B band.

The signal flow in the RF system 100 working in the 4G mode is as follows.

TX in the B28A band: the RF transceiver 11 (for example, WTR)→the second TX module 122 (for example, LB PAMID)→the second duplexer 152 (for example, B28A duplexer)→the second TX module 122 (for example, LB PAMID)→the second DPDT switch 132→the first DPDT switch 131→the first antenna 141.

TX in the B20/B8 band: the RF transceiver 11 (for example, WTR)→the second TX module 122 (for example, LB PAMID)→the second DPDT switch 132→the first DPDT switch 131→the first antenna 141.

PRX in the B28A band: the first antenna 141→the first DPDT switch 131→the second DPDT switch 132→the second TX module 122 (for example, LB PAMID)→the second duplexer 152 (for example, B28A duplexer)→the first RX module 123 (for example, MLNA)→the RF transceiver 11 (for example, WTR).

PRX in the B20/B8 band: the first antenna 141→the first DPDT switch 131→the second DPDT switch 132→the second TX module 122 (for example, LB PAMID)→the first RX module 123 (for example, MLNA)→the RF transceiver 11 (for example, WTR).

DRX in the B8/B20/B28A band: the second antenna 142→the second DPDT switch 132→the second RX module 124 (for example, L-DRX)→the RF transceiver 11 (for example, WTR).

In the RF system of FIG. 4a, two DPDT switches are provided, to distribute the TX in the first LB (i.e., LTE TX) and the TX in the second LB (i.e., NR TX) to different DPDT switches, which can prevent clutter caused by cross-modulation or burning-out of one DPDT switch from affecting the other DPDT switch.

In at least one implementation, the first DPDT switch 131 has a first P port coupled with the second antenna 142. The first DPDT switch 131 has a second P port coupled with the third antenna 143. The first DPDT switch 131 has a first T port coupled with the second TX module 122. The first DPDT switch 131 has a second T port coupled with the first RX port of the second RX module 124. The second DPDT switch 132 has a first P port coupled with the first antenna 141. The second DPDT switch 132 has a second P port coupled with the fourth antenna 144. The second DPDT switch 132 has a first T port coupled with the first duplexer 151. The second DPDT switch 132 has a second T port coupled with the first filtering module 16.

The first TX module 121 is coupled with the first antenna 141 through the first duplexer 151 and the transfer switch module 13 as follows.

The first TX module 121 is coupled with the first antenna 141 through the first duplexer 151 and the second DPDT switch 132.

The second TX module 122 is coupled with the second antenna 142 through the transfer switch module 13 as follows.

The second TX module 122 is coupled with the second antenna 142 through the first DPDT switch 131.

The first RX port of the first RX module 123 is coupled with the first antenna 141 through the first duplexer 151 and the transfer switch module 13 as follows.

The first RX port of the first RX module 123 is coupled with the first antenna 141 through the first duplexer 151 and the second DPDT switch 132.

The second RX port of the first RX module 123 is coupled with the second antenna 142 through the second duplexer 152, the second TX module 122, and the transfer switch module 13 as follows.

The second RX port of the first RX module 123 is coupled with the second antenna 142 through the second duplexer 152, the second TX module 122, and the first DPDT switch 131.

The third RX port of the first RX module 123 is coupled with the second antenna 142 through the second TX module 122 and the transfer switch module 13 as follows.

The third RX port of the first RX module 123 is coupled with the second antenna 142 through the second TX module 122 and the first DPDT switch 131.

The first RX port of the second RX module 124 is coupled with the second antenna 142 through the transfer switch module 13 as follows.

The first RX port of the second RX module 124 is coupled with the second antenna 142 through the first DPDT switch 131.

The second RX module 124 is coupled with the third antenna 143 through the transfer switch module 13 or the second filtering module as follows.

The first RX port of the second RX module 124 is coupled with the third antenna 143 through the first DPDT switch 131.

The second RX port of the second RX module 124 is coupled with the fourth antenna 144 through the first filter 161 as follows.

The second RX port of the second RX module 124 is coupled with the fourth antenna 144 through the first filter 161 and the second DPDT switch 132.

Figure 4B:
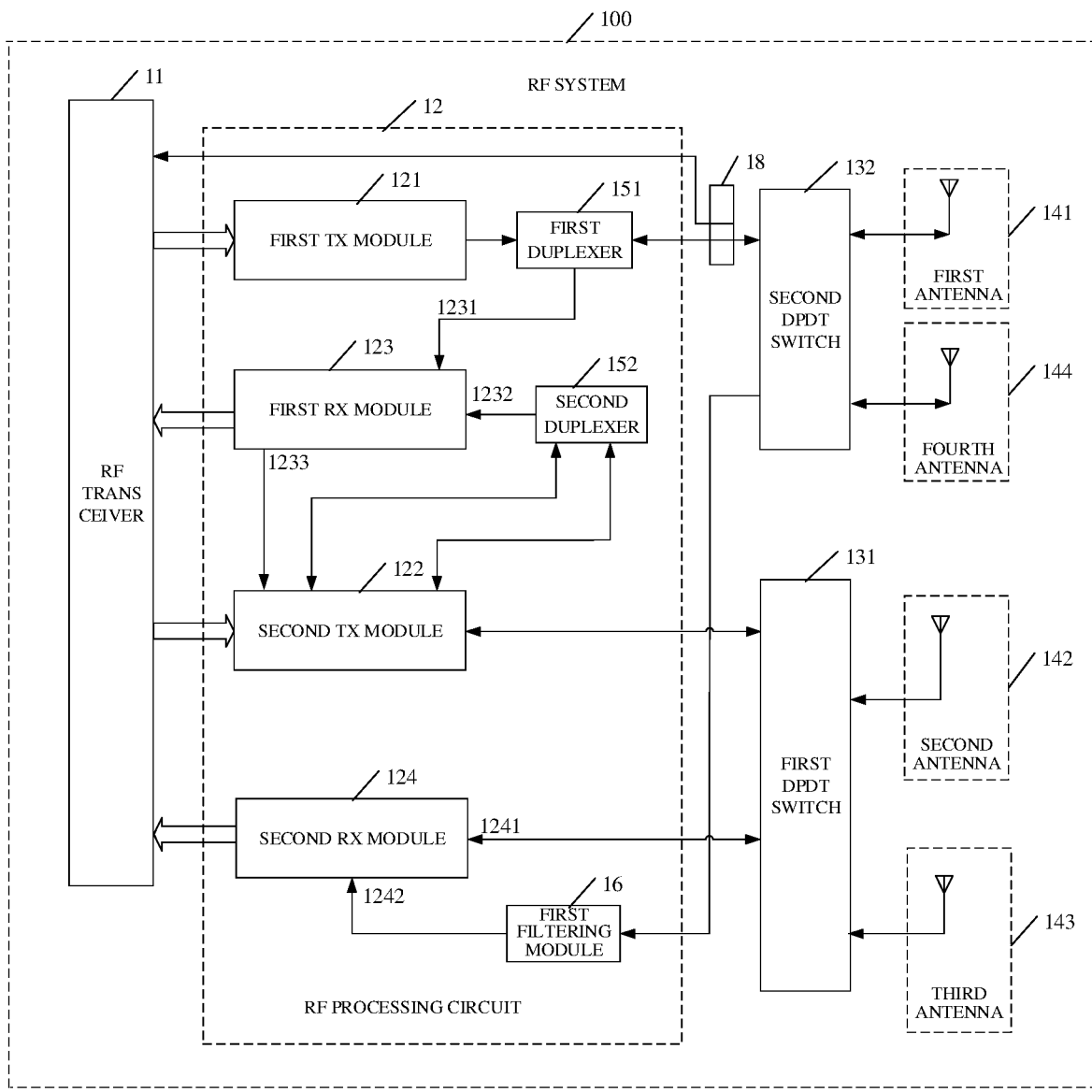
FIG. 4b is a schematic structural diagram illustrating an RF system where a transfer switch module of the RF system includes two transfer switches according to other implementations.

FIG. 4b is a schematic structural diagram illustrating an RF system where a transfer switch module of the RF system includes two transfer switches according to other implementations. As illustrated in FIG. 4b, the RF system 100 includes an RF transceiver 11, an RF processing circuit 12 coupled with the RF transceiver 11, a first DPDT switch 131 and a second DPDT switch 132, a first antenna 141, a second antenna 142, a third antenna 143, a fourth antenna 144, and a directional coupler 18.

The RF processing circuit 12 includes a first TX module 121, a second TX module 122, a first RX module 123, a second RX module 124, a first duplexer 151, a second duplexer 152, and a first filtering module 16 (embodied as a first filter 161).

The first TX module 121 is coupled with the first antenna 141 through the first duplexer 151, the directional coupler 18, and the second DPDT switch 132. The second TX module 122 is coupled with the second antenna 142 through the first DPDT switch 131. The first RX module 123 has a first RX port 1231 coupled with the first antenna 141 through the first duplexer 151, the directional coupler 18, and the second DPDT switch 132. The first RX module 123 has a second RX port 1232 coupled with the second antenna 142 through the second duplexer 152, the second TX module 122, and the first DPDT switch 131. The first RX module 123 has a third RX port 1233 coupled with the second antenna 142 through the second TX module 122 and the first DPDT switch 131. The second RX module 124 has a first RX port 1241 coupled with the second antenna 142 through the first DPDT switch 131. The second RX module 124 has a second RX port 1242 coupled with the fourth antenna 144 through the first filter 161 and the second DPDT switch 132. Antenna efficiency of the first antenna 141 and the second antenna 142 is higher than that of the third antenna 143 and the fourth antenna 144.

When the RF system 100 works in the NSA mode, the first antenna 141 is used for transmission in the first LB and primary reception in the first LB, the second antenna 142 is used for transmission in the second LB and primary reception in the second LB, the third antenna 143 is used for diversity reception in the second LB, the fourth antenna 144 is used for diversity reception in the first LB, and the first filter 161 is configured to filter out bands other than the first LB. That is, the first filter 161 can keep the first LB and filter out other bands.

When the RF system 100 works in the NSA mode, the following illustrates an example where the first LB is the B20 band, the first sub-band is the N8 band, and the second sub-band is the N28A band. The N28A band is a part of the N28 band, and the N28 band includes the N28A band and the N28B band.

The signal flow under B20+N28A EN-DC is as follows.

TX in the B20 band: the RF transceiver 11 (for example, WTR)→the first TX module 121 (for example, MMPA)→the first duplexer 151 (for example, B20 duplexer)→the directional coupler 18→the second DPDT switch 132→the first antenna 141.

PRX in the B20 band: the first antenna 141→the second DPDT switch 132→the directional coupler 18→the first duplexer (for example, B20 duplexer)→the first RX module 123 (for example, MLNA)→the RF transceiver 11 (for example, WTR).

DRX in the B20 band: the fourth antenna 144→the second DPDT switch 132→the first filter 161 (for example: B20 SAW)→the second RX module 124 (for example, L-DRX)→the RF transceiver 11 (for example, WTR).

TX in the N28A band: the RF transceiver 11 (for example, WTR)→the second TX module 122 (for example, LB PAMID)→the second duplexer 152 (for example, N28A duplexer)→the second TX module 122 (for example, LB PAMID)→the first DPDT switch 131→the second antenna 142.

PRX in the N28A band: the second antenna 142→the first DPDT switch 131→the second TX module 122 (for example, LB PAMID)→the second duplexer 152 (for example, N28A duplexer)→the first RX module 123 (for example, MLNA)→the RF transceiver 11 (for example, WTR).

DRX in the N28A band: the third antenna 143→the first DPDT switch 131→the second RX module 124 (for example, L-DRX)→the RF transceiver 11 (for example, WTR).

The signal flow under B20+N8 EN-DC is as follows.

TX in the B20 band: the RF transceiver 11 (for example, WTR)→the first TX module 121 (for example, MMPA)→the first duplexer 151 (for example, B20 duplexer)→the directional coupler 18→the second DPDT switch 132→the first antenna 141.

PRX in the B20 band: the first antenna 141→the second DPDT switch 132→the directional coupler 18→the first duplexer (for example, B20 duplexer)→the first RX module 123 (for example, MLNA)→the RF transceiver 11 (for example, WTR).

DRX in the B20 band: the fourth antenna 144→the second DPDT switch 132→the first filter 161 (for example: B20 SAW)→the second RX module 124 (for example, L-DRX)→the RF transceiver 11 (for example, WTR).

TX in the N8 band: the RF transceiver 11 (for example, WTR)→the second TX module 122 (for example, LB PAMID)→the first DPDT switch 131→the second antenna 142.

PRX in the N8 band: the second antenna 142→the first DPDT switch 131→the second TX module 122 (for example, LB PAMID)→the first RX module 123 (for example, MLNA)→the RF transceiver 11 (for example, WTR).

DRX in the N8 band: the third antenna 143→the first DPDT switch 131→the second RX module 124 (for example, L-DRX)→the RF transceiver 11 (for example, WTR).

The directional coupler 18 of the implementation can mix two RF signals to output. In an example, the directional coupler 18 can also have a function of power allocation, which is used to divide power of an input signal into multiple ways and feed them back to corresponding RX ports of the RF transceiver 11, so that the RF transceiver 11 can adjust the power of the RF signal it transmits.

In at least one implementation, when the RF system 100 works in the 4G mode, the first antenna 141 is used for transmission in the first LB and primary reception in the first LB, the second antenna 142 is used for transmission in the second LB and primary reception in the second LB, the third antenna 143 is used for diversity reception in the second LB, the fourth antenna 144 is used for diversity reception in the first LB, and the first filter 161 is configured to filter out bands other than the first LB.

When the RF system 100 works in the 4G mode, the following describes an example where the first LB is the B20 band, the first sub-band is the B8 band, and the second sub-band is the B28A band. The B28A band is a part of the B28 band, and the B28 band includes the B28A band and the B28B band.

The signal flow of the RF system 100 working in the 4G mode is as follows.

TX in the B28A band: the RF transceiver 11 (for example, WTR)→the second TX module 122 (for example, LB PAMID)→the second duplexer 152 (for example, B28A duplexer)→the second TX module 122 (for example, LB PAMID)→the first DPDT switch 131→the second antenna 142.

TX in the B8 band: the RF transceiver 11 (for example, WTR)→the second TX module 122 (for example, LB PAMID)→the first DPDT switch 131→the second antenna 142.

TX in the B20 band: the RF transceiver 11 (for example, WTR)→the first TX module 121 (for example, MMPA)→the first duplexer 151 (for example, B20 duplexer)→the directional coupler 18→the second DPDT switch 132→the first antenna 141.

PRX in the B28A band: the second antenna 142→the first DPDT switch 131→the second TX module 122 (for example, LB PAMID)→the second duplexer 152 (for example, B28A duplexer)→the first RX module 123 (for example, MLNA)→the RF transceiver 11 (for example, WTR).

PRX in the B8 band: the second antenna 142→the first DPDT switch 131→the second TX module 122 (for example, LB PAMID)→the first RX module 123 (for example, MLNA)→the RF transceiver 11 (for example, WTR).

PRX in the B20 band: the first antenna 141→the second DPDT switch 132→the directional coupler 18→the first duplexer (for example, B20 duplexer)→the first RX module 123 (for example, MLNA)→the RF transceiver 11 (for example, WTR).

DRX in the N8/B28A band: the third antenna 143→the first DPDT switch 131→the second RX module 124 (for example, L-DRX)→the RF transceiver 11 (for example, WTR).

DRX in the B20 band: the fourth antenna 144→the second DPDT switch 132→the first filter 161 (for example: B20 SAW)→the second RX module 124 (for example, L-DRX)→the RF transceiver 11 (for example, WTR).

In the RF system of FIG. 4b, two DPDT switches are provided, to distribute the TX in the first LB (i.e., LTE TX) and the TX in the second LB (i.e., NR TX) to different DPDT switches, which can prevent clutter caused by cross-modulation or burning-out of one DPDT switch from affecting the other DPDT switch.

It should be noted that, in an example, the first antenna 141 in FIG. 4b is replaced with the third antenna 143, and the second antenna 142 in FIG. 4b is replaced with the first antenna 141, and the third antenna 143 in FIG. 4b is replaced with the second antenna 142. In this case, when the RF system 100 works in the 4G mode, the first antenna 141 is used for transmission in the first LB and primary reception in the first LB and is further used for transmission in the second LB and primary reception in the second LB and the second antenna 142 is used for diversity reception in the first LB or the second LB.

Figure 5:
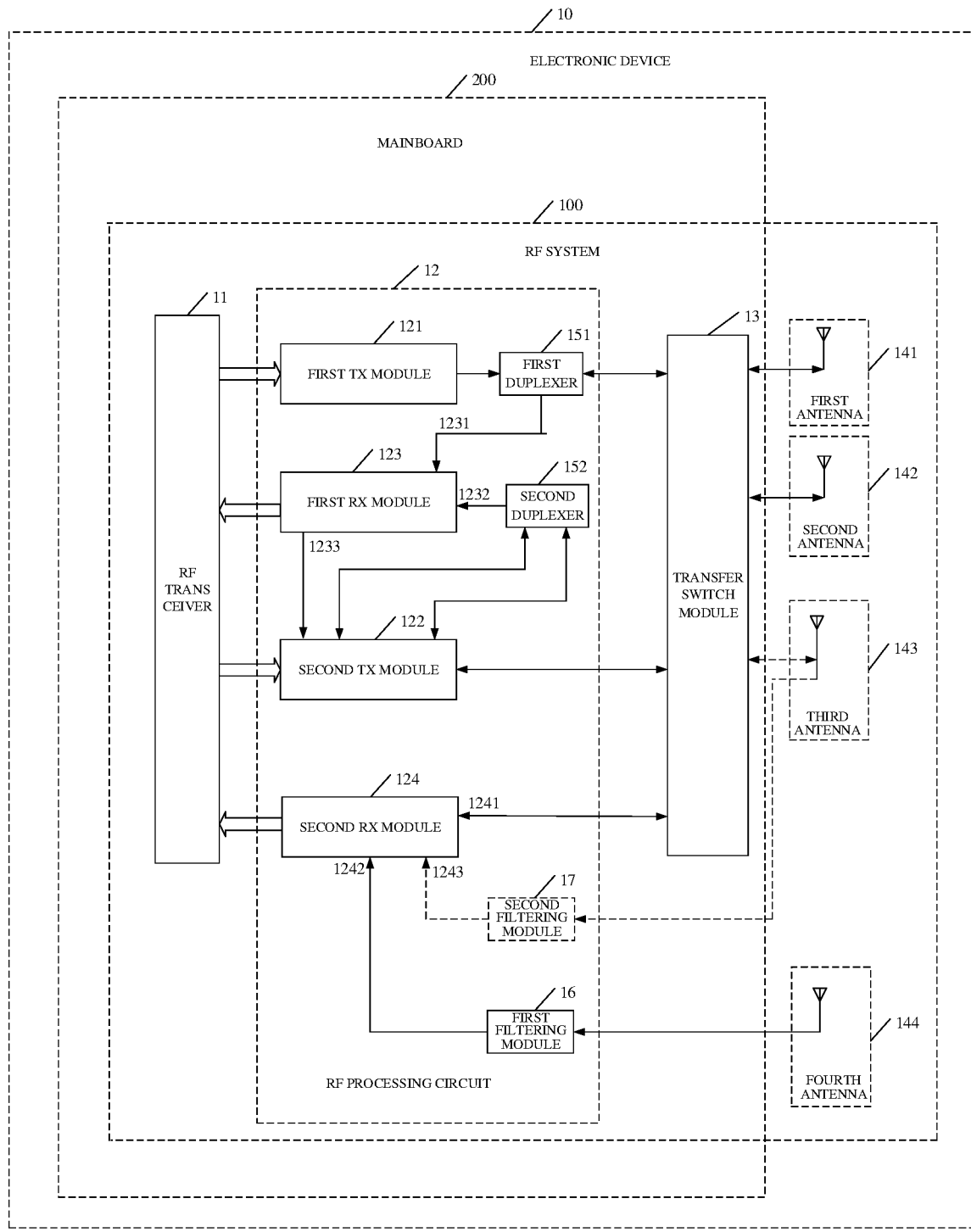
FIG. 5 is a schematic structural diagram illustrating an electronic device according to implementations.

FIG. 5 is a schematic structural diagram illustrating an electronic device according to implementations. As illustrated in FIG. 5, the electronic device 10 includes an RF system 100 described in FIG. 1, FIG. 3a, FIG. 3b, FIG. 4a, or FIG. 4b and a mainboard 200, where a first TX module 121, a second TX module 122, a first RX module 123, a second RX module 124, a first duplexer 151, a second duplexer 152, and a first filter 161 of the RF system 100 can be disposed on the mainboard 200. When the RF system 100 works in a NSA mode, the RF system 100 is configured to implement transmission and reception in a first LB and transmission and reception in a second LB.

In at least one implementation, the above RF system further includes a third duplexer, a first selector-switch, and a second selector-switch. The following will describe the RF system including a third duplexer, a first selector-switch, and a second selector-switch with reference to FIG. 6-FIG. 11.

Figure 6:
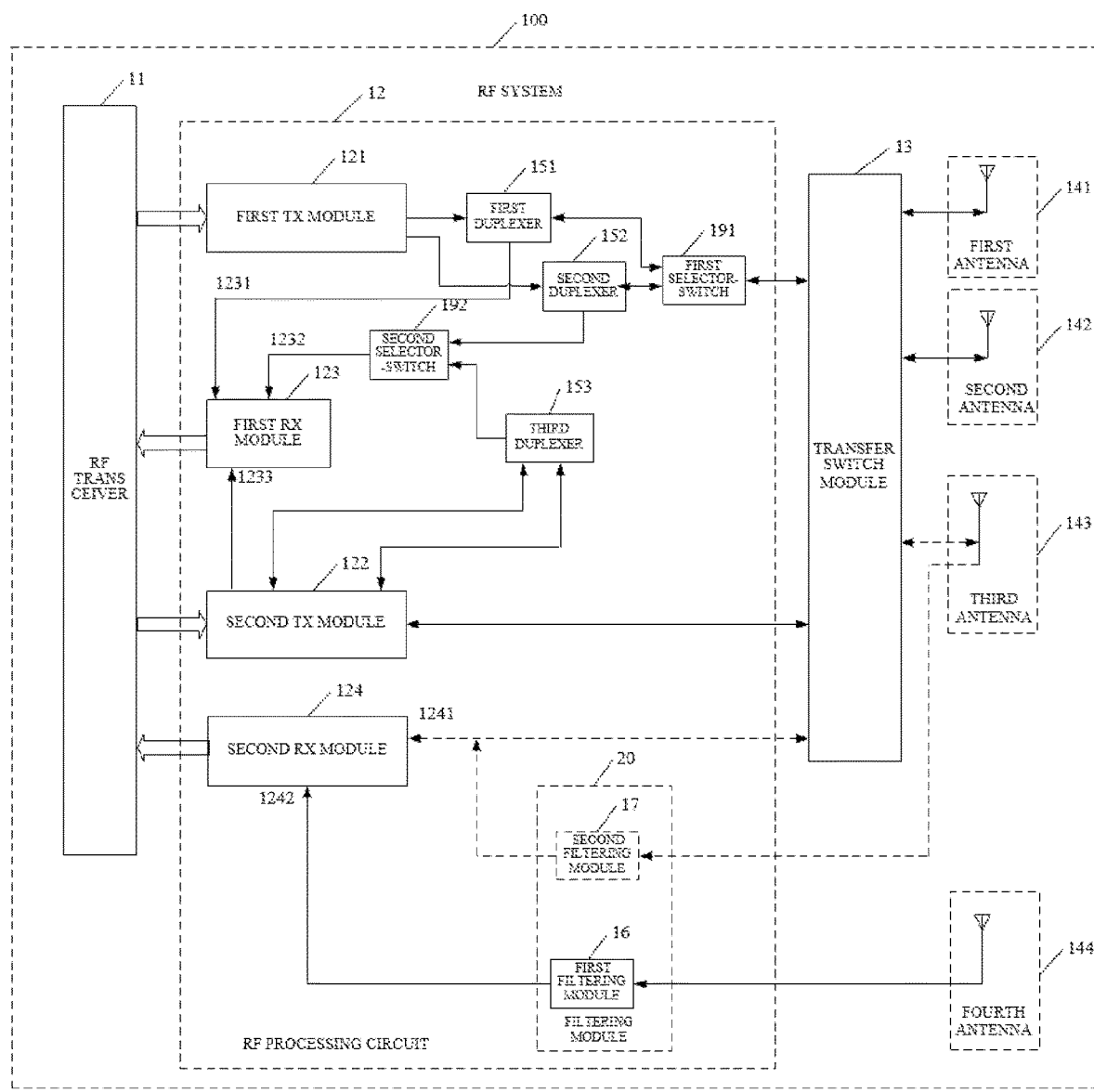
FIG. 6 is a schematic structural diagram illustrating an RF system according to implementations.

FIG. 6 is a schematic structural diagram illustrating an RF system according to implementations. As illustrated in FIG. 6, the RF system 100 includes an RF transceiver 11, an RF processing circuit 12 coupled with the RF transceiver 11, a transfer switch module 13, a first antenna 141, a second antenna 142, a third antenna 143, and a fourth antenna 144.

The RF processing circuit 12 includes a first transmit (TX) module 121, a second TX module 122, a first receive (RX) module 123, a second RX module 124, a first duplexer 151, a second duplexer 152, a third duplexer 153, a first selector-switch 191, a second selector-switch 192, and a filtering module 20.

In addition to the description illustrated in FIG. 1, the first TX module 121 is coupled with the transfer switch module 13 through the first duplexer 151 and the first selector-switch 191 or coupled with the transfer switch module 13 through the second duplexer 152 and the first selector-switch 191, the first RX port 1231 of the first RX module 123 is coupled with the transfer switch module 13 through the first duplexer 151 and the first selector-switch 191, and the second RX port 1232 of the first RX module 123 is coupled with the transfer switch module 13 through the second selector-switch 192, the second duplexer 152, and the first selector-switch 191 or coupled with the transfer switch module 13 through the second selector-switch 192, the third duplexer 153, the second TX module 122.

The filtering module 20 can include a first filtering module 16 or include the first filtering module 16 and a second filtering module 17.

In detail, the first TX module 121 is coupled with the first antenna 141 through the first duplexer 151, the first selector-switch 191, and the transfer switch module 13. The first TX module 121 is coupled with the first antenna 141 through the second duplexer 152, the first selector-switch 191, and the transfer switch module 13. The second TX module 122 is coupled with the second antenna 142 through the transfer switch module 13. The first RX port 1231 of the first RX module 123 is coupled with the first antenna 141 through the first duplexer 151, the first selector-switch 191, and the transfer switch module 13. The second RX port 1232 of the first RX module 123 is coupled with the first antenna 141 through the second selector-switch 192, the second duplexer 152, the first selector-switch 191, and the transfer switch module 13. The second RX port 1232 of the first RX module 123 is coupled with the second antenna 142 through the second selector-switch 192, the third duplexer 153, the second TX module 122, and the transfer switch module 13. The third RX port 1233 of the first RX module 123 is coupled with the second antenna 142 through the second TX module 122 and the transfer switch module 13. The first RX port 1241 of the second RX module 124 is coupled with the third antenna 143 through the transfer switch module 13 or the second filtering module 17. The second RX port 1242 of the second RX module 124 is coupled with the fourth antenna 144 through the first filtering module 16. Antenna efficiency of the first antenna 141 and the second antenna 142 is higher than that of the third antenna 143 and the fourth antenna 144.

When the RF system 100 works in a non-standalone (NSA) mode, the first antenna 141 is used for transmission in a first low-band (LB) and primary reception in the first LB, the second antenna 142 is used for transmission in a second LB and primary reception in the second LB, the third antenna 143 is used for diversity reception in the second LB, and the fourth antenna 144 is used for diversity reception in the first LB, and the first filtering module 16 is configured to filter out bands other than the first LB.

For the convenience of explanation, the following illustrates a case where the NSA mode includes the EN-DC architecture.

In the implementation of this application, the first LB may include a 4G band, for example, B20 band (uplink: 832-862 MHz and downlink: 791-821 MHz) or B28 band (uplink: 703-748 MHz and downlink: 758-803 MHz); the second LB may include a 5G band, for example, N5 band (uplink: 824-849 MHz and downlink: 869-894 MHz) or N8 band (uplink: 880-915 MHz and downlink: 925-960 MHz) or N28 band (uplink: 703-748 MHz and downlink: 758-803 MHz). The frequency range of B5 in the 4G band is the same as that of N5 in the 5G band, the frequency range of B8 in the 4G band is the same as that of N8 in the 5G band, and the frequency range of B28 in the 4G band is the same as that of N28 in the 5G band.

Under the EN-DC architecture, the first antenna 141 is used for transmission in the first LB and primary reception in the first LB, the second antenna 142 is used for transmission in the second LB and primary reception in the second LB, the third antenna 143 is used for diversity reception in the second LB, and the fourth antenna 144 is used for diversity reception in the first LB. For example, the first antenna 141 is used for transmission and primary reception in the B20 band or the B28 band, the second antenna 142 is used for transmission and primary reception in the N5 band or the N8 band or the N28 band, the third antenna 143 is used for diversity reception in the N5 band or the N8 band or the N28 band, and the fourth antenna 144 is used for diversity reception in the B20 band or the B28 band.

In the implementation, a TX path in the first LB includes: the RF transceiver 11→the first TX module 121→the first duplexer 151/the second duplexer 152→the first selector-switch 191→the transfer switch module 13→the first antenna 141.

A PRX path in the first LB includes: the first antenna 141→the transfer switch module 13→the first selector-switch 191→the first duplexer 151→the first RX module 123→the RF transceiver 11, or includes: the first antenna 141→the transfer switch module 13→the first selector-switch 191→the second duplexer 152→the second selector-switch 192→the first RX module 123→the RF transceiver 11.

A DRX path in the first LB includes: the fourth antenna 144→the first filtering module 16→the second RX module 124→the RF transceiver 11, or includes: the fourth antenna 144→the transfer switch module 13→the first filtering module 16→the second RX module 124→the RF transceiver 11.

A TX path in the second LB includes: the RF transceiver 11→the second TX module 122→the third duplexer 153→the second TX module 122→the transfer switch module 13→the second antenna 142, or includes: the RF transceiver 11→the second TX module 122→the transfer switch module 13→the second antenna 142.

A PRX path in the second LB includes: the second antenna 142→the transfer switch module 13→the second TX module 122→the third duplexer 153→the first RX module 123→the RF transceiver 11, or includes: the second antenna 142→the transfer switch module 13→the second TX module 122→the first RX module 123→the RF transceiver 11.

A DRX path in the second LB includes: the third antenna 143→the transfer switch module 13→the second RX module 124→the RF transceiver 11, or includes the third antenna 143→the second filtering module 17→the second RX module 124→the RF transceiver 11.

The RF path in the first LB includes: a TX path in the first LB, a PRX path in the first LB, and a DRX path in the first LB. The RF path in the second LB includes: a TX path in the second LB, a PRX path in the second LB, and a DRX path in the second LB.

The RF path in the first LB (for example, LB LTE band) only circulates TX signals, PRX signals, and DRX signals. The RF path in the second LB (for example, LB NR band)

circulates TX signals, PRX signals, DRX signals, multiple-input multiple-output PRX (MIMO PRX) signals, and MIMO DRX signals.

In at least one implementation, the first LB includes a first sub-band or a second sub-band and the second LB includes a third sub-band, a fourth sub-band, or a fifth sub-band.

For example, the first sub-band is the B20 band (uplink: 832-862 MHz and downlink: 791-821 MHz); the second sub-band is the B28 band (uplink: 703-748 MHz and downlink: 758-803 MHz); the third sub-band is the N5 band (uplink: 824-849 MHz and downlink: 869-894 MHz) or B5 band; the fourth sub-band is the N8 band (uplink: 880-915 MHz and downlink: 925-960 MHz) or B8 band; the fifth sub-band is the N28 band (uplink: 703-748 MHz and downlink: 758-803 MHz) or B28 band.

In an example, in the NSA mode, the first sub-band is the B20 band, the second sub-band is the B28 band, the third sub-band is the N5 band, the fourth sub-band is the N8 band, and the fifth sub-band is the N28 band; in the 4G mode, the first sub-band is the B20 band, the second sub-band is the B28 band, the third sub-band is the B5 band, the fourth sub-band is the B8 band, and the fifth sub-band is the B28 band.

In the implementation, the first duplexer 151 may allow simultaneous transmission and primary reception in the first LB (for example, B20 band); the second duplexer 152 may allow simultaneous transmission and primary reception in the second LB (for example, B28A band); the third duplexer 153 may allow simultaneous transmission and primary reception in the second LB (for example, N28A band).

In at least one example, the first selector-switch 191 and the second selector-switch 192 may be embodied as SPDT switches.

In at least one example, the transfer switch module 13 may include at least one of a DPDT switch, a DP3T switch, a 3P3T switch, a 4P4T switch, a DP4T switch, and an SPDT switch. The DPDT switch, the DP3T switch, the 3P3T switch, the 4P4T switch, the DP4T switch, and the SPDT switch are all full-coupling switches.

The DPDT switch can include 2 input (IN) ports and 2 output (OUT) ports, which can realize switching between connections achieved through the 2 IN ports and the 2 OUT ports. The DP3T switch can include 3 IN ports and 2 OUT ports. The 3P3T switch can include 3 IN ports and 3 OUT ports, which can realize switching between connections achieved through the 3 IN ports and the 3 OUT ports. The 4P4T switch can include 4 IN ports and 4 OUT ports. The DP4T switch can include 4 IN ports and 2 OUT ports, which can realize switching between connections achieved through the 4 IN ports and the 2 OUT ports. The SPDT switch can include 1 IN port and 2 OUT ports, which can realize switching between connections achieved through the 1 IN port and the 2 OUT ports.

According to the implementations, four antennas are adopted to support dual connection of the first LB and the second LB, to achieve simultaneous transmission and reception in the first LB and in the second LB, and uplink signals are distributed on two antennas with better antenna efficiency, to ensure reliability of the uplink signals.

In at least one implementation, when the RF system 100 works or operates in the 4G mode, the first antenna 141 is used for transmission in the first LB and primary reception in the first LB and is further used for transmission in the second LB and primary reception in the second LB, and the second antenna 142 is used for diversity reception in the first LB or the second LB.

In the implementation, the first LB may include a 4G band, for example, the B20 band (uplink: 832-862 MHz and downlink: 791-821 MHz) or the B28 band (uplink: 703-748 MHz and downlink: 758-803 MHz); the second LB may include a 4G band, for example, the B5 band (uplink: 824-849 MHz and downlink: 869-894 MHz) or the B8 band (uplink: 880-915 MHz, downlink: 925-960 MHz) or the B28 band (uplink: 703-748 MHz and downlink: 758-803 MHz).

In the implementation, when the RF system 100 works in the 4G mode, the third antenna 143 and the fourth antenna 144 in the RF system 100 are not used or only used for reception or receive (RX) in LB, to achieve 4RX/4×4 MIMO function.

In the implementation, a TX path in the first LB includes: the RF transceiver 11→the second TX module 122→the transfer switch module 13→the first antenna 141, or includes: the RF transceiver 11→the second TX module 122→the third duplexer 153→the second TX module 122→the transfer switch module 13→the first antenna 141.

A PRX path in the first LB includes: the first antenna 141→the transfer switch module 13→the second TX module 122→the first RX module 123→the RF transceiver 11, or includes: the first antenna 141→the transfer switch module 13→the second TX module 122→the third duplexer 153→the first RX module 123→the RF transceiver 11.

A DRX path in the first LB includes: the second antenna 142→the transfer switch module 13→the second RX module 124→the RF transceiver 11.

A TX path in the second LB includes: the RF transceiver 11→the second TX module 122→the transfer switch module 13→the first antenna 141, or includes: the RF transceiver 11→the second TX module 122→the third duplexer 153→the second TX module 122→the transfer switch module 13→the first antenna 141.

A PRX path in the second LB includes: the first antenna 141→the transfer switch module 13→the second TX module 122→the first RX module 123→the RF transceiver 11, or includes: the first antenna 141→the transfer switch module 13→the second TX module 122→the third duplexer 153→the first RX module 123→the RF transceiver 11.

A DRX path in the second LB includes: the second antenna 142→the transfer switch module 13→the second RX module 124→the RF transceiver 11.

The RF path in the first LB includes: a TX path in the first LB, a PRX path in the first LB, and a DRX path in the first LB. The RF path in the second LB includes: a TX path in the second LB, a PRX path in the second LB, and a DRX path in the second LB.

The transfer switch module 13 can include one transfer switch or two transfer switches.

In at least one implementation, when the transfer switch module 13 is embodied as one transfer switch, the transfer switch module includes a DP3T switch, a 3P3T switch, or a 4P4T switch.

In at least one implementation, when the transfer switch module is embodied as the DP3T switch, the filtering module 20 includes the first filtering module 16 and the second filtering module 17 and the first RX port 1241 of the second RX module 124 is further coupled with the second filtering module 17.

Figure 7A:
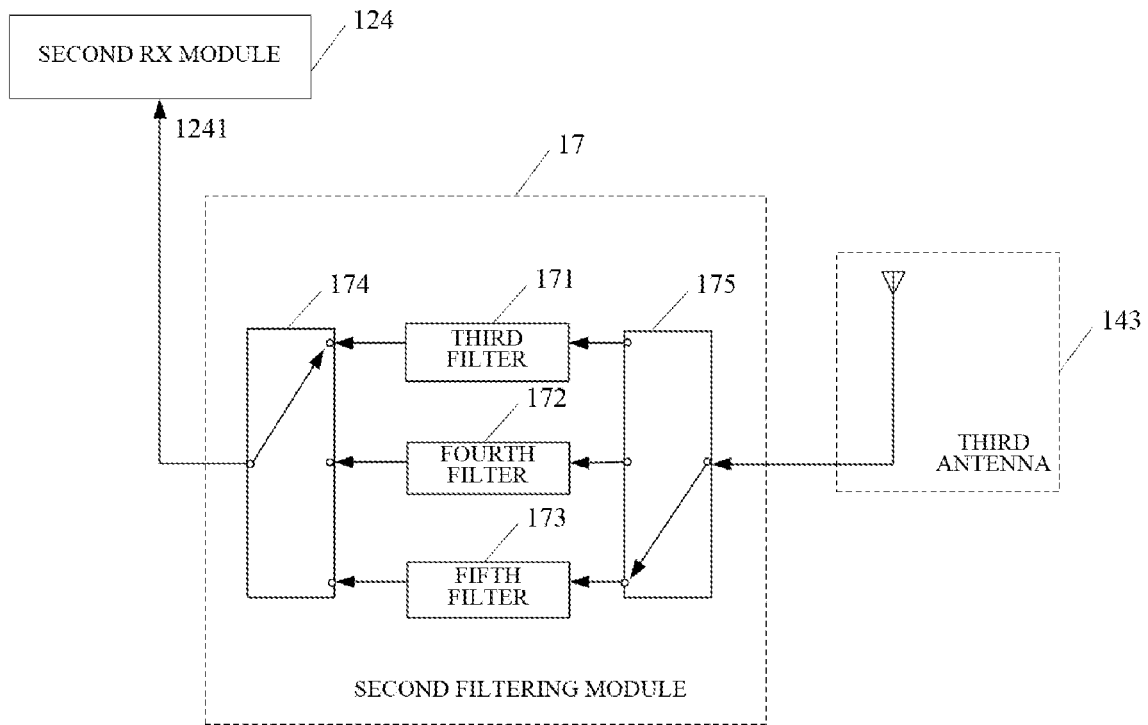
FIG. 7a is a schematic structural diagram illustrating a second filtering module according to implementations.

FIG. 7a is a schematic structural diagram illustrating a second filtering module according to implementations. As illustrated in FIG. 7a, the second filtering module 17 includes a third filter 171, a fourth filter 172, a fifth filter 173, a first single-pole triple-throw (SP3T) switch 174, and a second SP3T switch 175. The first SP3T switch 174 has a P port coupled with the first RX port 1241 of the second RX module 124. The first SP3T switch 174 has a first T port coupled with a first end of the third filter 171. The first SP3T switch 174 has a second T port coupled with a first end of the fourth filter 172. The first SP3T switch 174 has a third T port coupled with a first end of the fifth filter 173. The third filter 171 has a second end coupled with a first T port of the second SP3T switch 175. The fourth filter 172 has a second end coupled with a second T port of the second SP3T switch 175. The fifth filter 173 has a second end coupled with a third T port of the second SP3T switch 175. The second SP3T switch 175 has a P port coupled with the third antenna 143.

The third filter 171 is configured to filter out bands other than the third sub-band, the fourth filter 172 is configured to filter out bands other than the fourth sub-band, and the fifth filter 173 is configured to filter out bands other than the fifth sub-band.

The third sub-band can include the N5 band (uplink: 824-849 MHz and downlink: 869-894 MHz) or the B5 band. The fourth sub-band can include the N8 band (uplink: 880-915 MHz and downlink: 925-960 MHz) or the B8 band. The fifth sub-band can include the N28 band (uplink: 703-748 MHz and downlink: 758-803 MHz) or the B28 band.

Figure 7B:
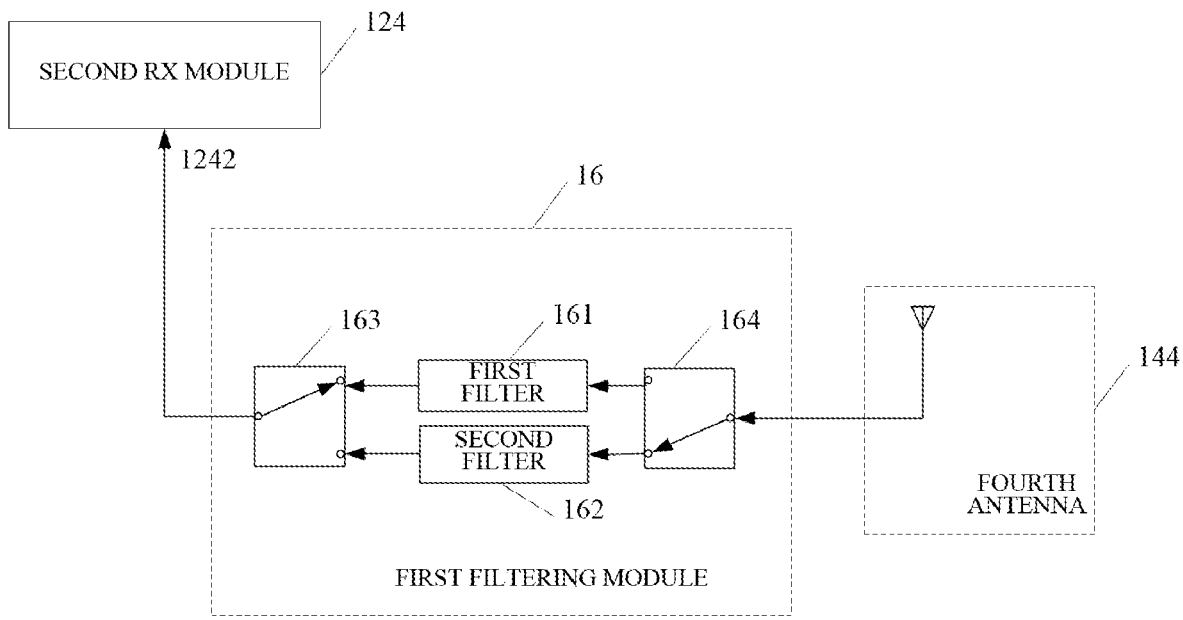
FIG. 7b is a schematic structural diagram illustrating a first filtering module according to implementations.

FIG. 7*b* is a schematic structural diagram illustrating a first filtering module according to implementations. As illustrated in FIG. 7*b*, the first filtering module 16 includes a first SPDT switch 163, a second SPDT switch 164, a first filter 161, and a second filter 162. The first SPDT switch 163 has a P port coupled with the second RX port 1242 of the second RX module 124. The first SPDT switch 163 has a first T port coupled with a first end of the first filter 161. The first SPDT switch 163 has a second T port coupled with a first end of the second filter 162. The first filter 161 has a second end coupled with a first T port of the second SPDT switch 164. The second filter 162 has a second end coupled with a second T port of the second SPDT switch 164. The second SPDT switch 164 has a P port coupled with the fourth antenna 144.

The first filter 161 is configured to filter out bands other than the first sub-band, and the second filter 162 is configured to filter out bands other than the second sub-band.

The first sub-band can include the B20 band (uplink: 832-862 MHz and downlink: 791-821 MHz). The second sub-band can include the B28 band (uplink: 703-748 MHz and downlink: 758-803 MHz).

Figure 8A:
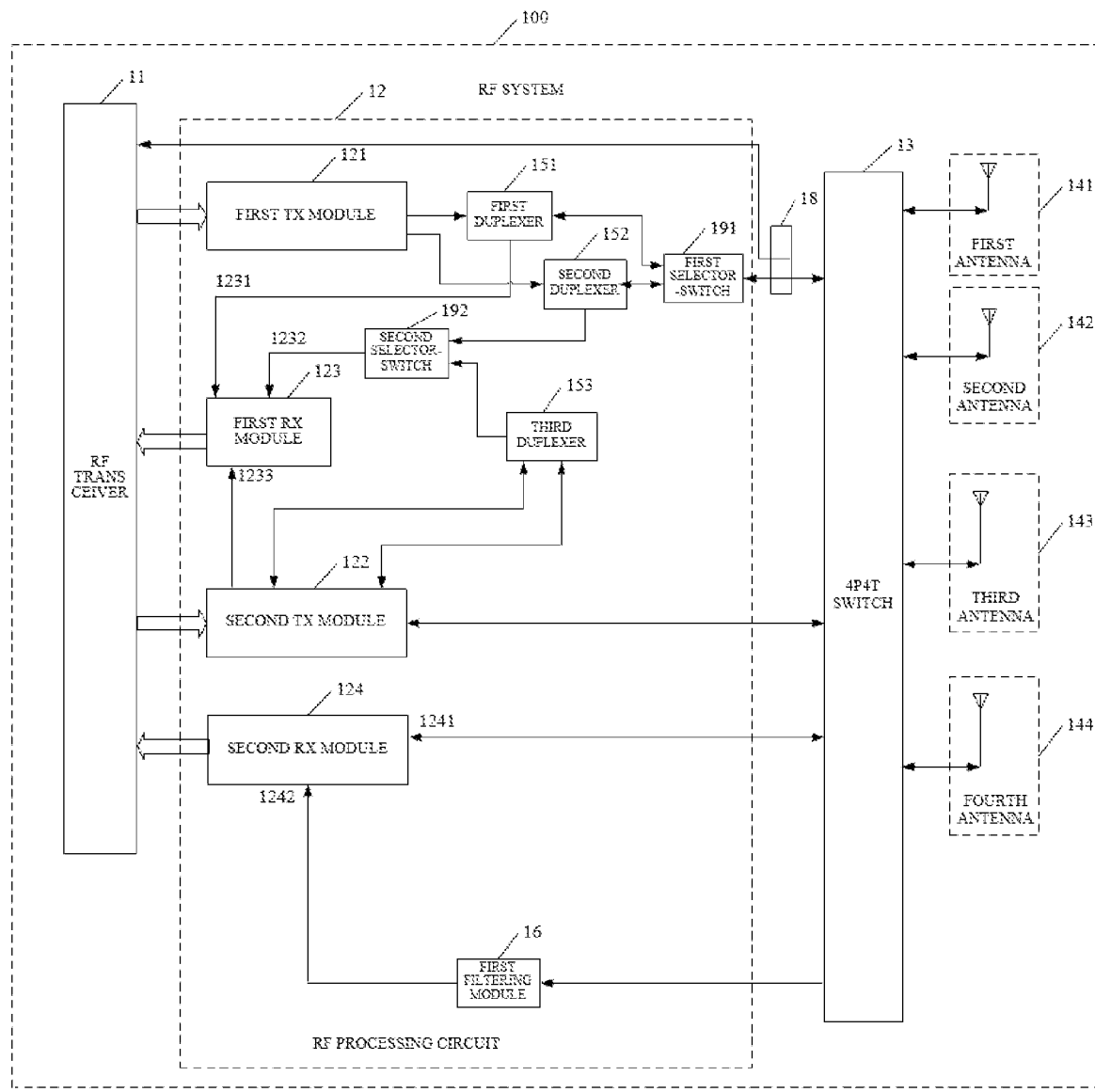
FIG. 8a is a schematic structural diagram illustrating an RF system where a transfer switch module of the RF system is a quad-pole quad-throw (4P4T) switch according to implementations.

FIG. 8*a* is a schematic structural diagram illustrating an RF system where a transfer switch module of the RF system is a 4P4T switch according to implementations. As illustrated in FIG. 8*a*, the RF system 100 includes an RF transceiver 11, an RF processing circuit 12 coupled with the RF transceiver 11, a 4P4T switch 13, a first antenna 141, a second antenna 142, a third antenna 143, a fourth antenna 144, and a directional coupler 18.

The RF processing circuit 12 includes a first TX module 121, a second TX module 122, a first RX module 123, a second RX module 124, a first duplexer 151, a second duplexer 152, a third duplexer 153, a first selector-switch 191, a second selector-switch 192, and a first filtering module 16.

The first TX module 121 is coupled with the first antenna 141 through the first duplexer 151, the first selector-switch 191, the directional coupler 18, and the 4P4T switch 13. The first TX module 121 is coupled with the first antenna 141 through the second duplexer 152, the first selector-switch 191, the directional coupler 18, and the 4P4T switch 13. The second TX module 122 is coupled with the second antenna 142 through the 4P4T switch 13. The first RX module 123 has a first RX port 1231 coupled with the first antenna 141 through the first duplexer 151, the first selector-switch 191, the directional coupler 18, and the 4P4T switch 13. The first RX module 123 has a second RX port 1232 coupled with the first antenna 141 through the second selector-switch 192, the second duplexer 152, the first selector-switch 191, the directional coupler 18, and the 4P4T switch 13. The second RX port 1232 of the first RX module 123 is coupled with the second antenna 142 through the second selector-switch 192, the third duplexer 153, the second TX module 122, and the 4P4T switch 13. The first RX module 123 has a third RX port 1233 coupled with the second antenna 142 through the second TX module 122 and the 4P4T switch 13. The second RX module 124 has a first RX port 1241 coupled with the third antenna 143 through the 4P4T switch 13. The second RX module 124 has a second RX port 1242 coupled with the fourth antenna 144 through the first filtering module 16 and the 4P4T switch 13. Antenna efficiency of the first antenna 141 and the second antenna 142 is higher than that of the third antenna 143 and the fourth antenna 144.

When the RF system 100 works in a NSA mode, the first antenna 141 is used for transmission in a first LB and primary reception in the first LB, the second antenna 142 is used for transmission in a second LB and primary reception in the second LB, the third antenna 143 is used for diversity reception in the second LB, and the fourth antenna 144 is used for diversity reception in the first LB, and the first filtering module 16 is configured to filter out bands other than the first LB.

In at least one implementation, the first LB includes a first sub-band or a second sub-band and the second LB includes a third sub-band, a fourth sub-band, or a fifth sub-band.

In the case that the RF system 100 works in the NSA mode, the following illustrates an example where the first sub-band is the B20 band, the second sub-band is the B28A band, the third sub-band is the N5 band, the fourth sub-band is the N8 band, and the fifth sub-band is the N28A band. The B28A band is a part of the B28 band, which includes the B28A band and the B28B band. The N28A band is a part of N28 band, which includes the N28A band and the N28B band.

The signal flow direction (signal flow for short) under B20+N28A EN-DC is as follows.

TX in the B20 band: the RF transceiver 11 (for example, WTR)→the first TX module 121 (for example, MMPA)→the first duplexer 151 (for example, B20 duplexer)→the directional coupler 18→the 4P4T switch 13→the first antenna 141.

PRX in the B20 band: the first antenna 141→the 4P4T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the 4P4T switch 13→the first filtering module 16 (for example: B20+B28 SAW)→the second RX module 124 (for example, L-DRX)→the RF transceiver 11 (for example, WTR).

TX in the N28A band: the RF transceiver 11 (for example, WTR)→the second TX module 122 (for example, LB PAMID)→the third duplexer 153 (for example, N28A duplexer)→the second TX module 122 (for example, LB PAMID)→the 4P4T switch 13→the second antenna 142.

PRX in the N28A band: the second antenna 142→the 4P4T switch 13→the second TX module 122 (for example, LB PAMID)→the third duplexer 153 (for example, N28A duplexer)→the first RX module 123 (for example, MLNA)→the RF transceiver 11 (for example, WTR).

DRX in the N28A band: the third antenna 143→the 4P4T switch 13→the second RX module 124 (for example, L-DRX)→the RF transceiver 11 (for example, WTR).

The signal flow under B20+N8 EN-DC is as follows.

TX in the B20 band: the RF transceiver 11 (for example, WTR)→the first TX module 121 (for example, MMPA)→the first duplexer 151 (for example, B20 duplexer)→the directional coupler 18→the 4P4T switch 13→the first antenna 141.

PRX in the B20 band: the first antenna 141→the 4P4T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the 4P4T switch 13→the first filtering module 16 (for example: B20+B28 SAW)→the second RX module 124 (for example, L-DRX)→the RF transceiver 11 (for example, WTR).

TX in the N8 band: the RF transceiver 11 (for example, WTR)→the second TX module 122 (for example, LB PAMID)→the 4P4T switch 13→the second antenna 142.

PRX in the N8 band: the second antenna 142→the 4P4T switch 13→the second TX module 122 (for example, LB PAMID)→the first RX module 123 (for example, MLNA)→the RF transceiver 11 (for example, WTR).

DRX in the N8 band: the third antenna 143→the 4P4T switch 13→the second RX module 124 (for example, L-DRX)→the RF transceiver 11 (for example, WTR).

The signal flow under B28A+N5 EN-DC is as follows.

TX in the B28A band: the RF transceiver 11 (for example, WTR)→the first TX module 121 (for example, MMPA)→the second duplexer 152 (for example, B28A duplexer)→the directional coupler 18→the 4P4T switch 13→the first antenna 141.

PRX in the B28A band: the first antenna 141→the 4P4T switch 13→the directional coupler 18→the second duplexer 152 (for example, B28A duplexer)→the first RX module 123 (for example, MLNA)→the RF transceiver 11 (for example, WTR).

DRX in the B28A band: the fourth antenna 144→the 4P4T switch 13→the first filtering module 16 (for example: B20+B28 SAW)→the second RX module 124 (for example, L-DRX)→the RF transceiver 11 (for example, WTR).

TX in the N5 band: the RF transceiver 11 (for example, WTR)→the second TX module 122 (for example, LB PAMID)→the 4P4T switch 13→the second antenna 142.

PRX in the N5 band: the second antenna 142→the 4P4T switch 13→the second TX module 122 (for example, LB PAMID)→the first RX module 123 (for example, MLNA)→the RF transceiver 11 (for example, WTR).

DRX in the N5 band: the third antenna 143→the 4P4T switch 13→the second RX module 124 (for example, L-DRX)→the RF transceiver 11 (for example, WTR).

The B20+B28 SAW can reserve the B20 and B28 bands and filter out other bands.

The directional coupler 18 of the implementation can mix two RF signals to output. In an example, the directional coupler 18 can also have a function of power allocation, which is used to divide power of an input signal into multiple ways and feed them back to corresponding RX ports of the RF transceiver 11, so that the RF transceiver 11 can adjust the power of the RF signal it transmits.

In at least one implementation, when the RF system 100 works in the 4G mode, the first antenna 141 is used for transmission in the first LB and primary reception in the first LB and is further used for transmission in the second LB and primary reception in the second LB, and the second antenna 142 is used for diversity reception in the first LB or the second LB.

When the RF system 100 works in the 4G mode, the following illustrates an example where the first sub-band is the B20 band, the second sub-band is the B28 band, the third sub-band is the B5 band, and the fourth sub-band is the B8 band.

The signal flow of the RF system 100 working in the 4G mode is as follows.

TX in the B28 band: the RF transceiver 11 (for example, WTR)→the second TX module 122 (for example, LB PAMID)→the third duplexer 153 (for example, N28A duplexer)→the second TX module 122 (for example, LB PAMID)→the 4P4T switch 13→the first antenna 141.

TX in the B5/B8/B20 band: the RF transceiver 11 (for example, WTR)→the second TX module 122 (for example, LB PAMID)→the 4P4T switch 13→the first antenna 141.

PRX in the B28 band: the first antenna 141→the 4P4T switch 13→the second TX module 122 (for example, LB PAMID)→the third duplexer 153 (for example, N28A duplexer)→the first RX module 123 (for example, MLNA)→the RF transceiver 11 (for example, WTR).

PRX in the B5/B8/B20 band: the first antenna 141→the 4P4T switch 13→the second TX module 122 (for example, LB PAMID)→the first RX module 123 (for example, MLNA)→the RF transceiver 11 (for example, WTR).

DRX in the B5/B8/B20/B28 band: the second antenna 142→the 4P4T switch 13→the second RX module 124 (for example, L-DRX)→the RF transceiver 11 (for example, WTR).

Figure 8B:
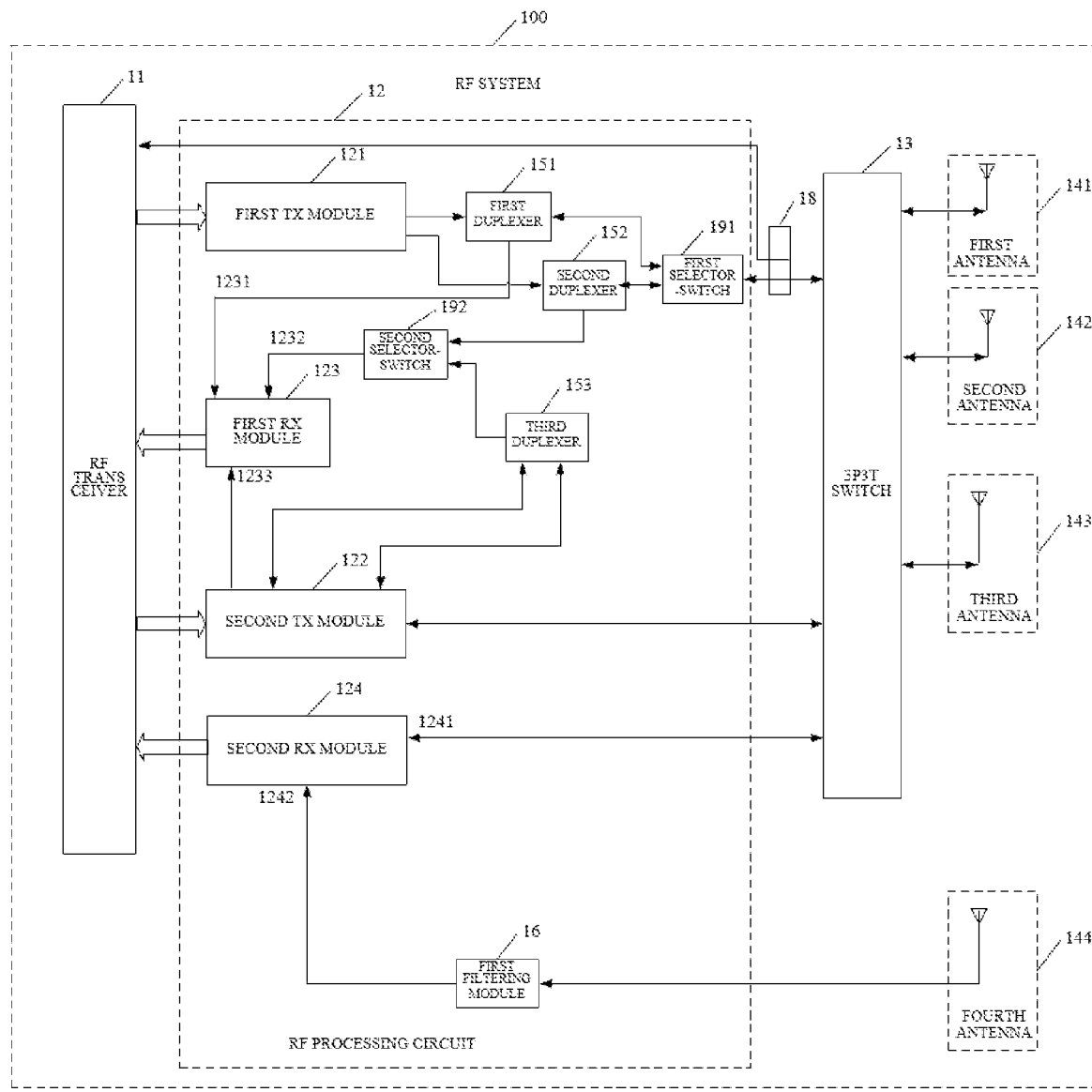
FIG. 8b is a schematic structural diagram illustrating an RF system where a transfer switch module of the RF system is a 3P3T switch according to implementations.

FIG. 8b is a schematic structural diagram illustrating an RF system where a transfer switch module of the RF system is a 3P3T switch according to implementations. As illustrated in FIG. 8b, the RF system 100 includes an RF transceiver 11, an RF processing circuit 12 coupled with the RF transceiver 11, a 3P3T switch 13, a first antenna 141, a second antenna 142, a third antenna 143, a fourth antenna 144, and a directional coupler 18.

The RF processing circuit 12 includes a first TX module 121, a second TX module 122, a first RX module 123, a second RX module 124, a first duplexer 151, a second duplexer 152, a third duplexer 153, a first selector-switch 191, a second selector-switch 192, and a first filtering module 16.

The first TX module 121 is coupled with the first antenna 141 through the first duplexer 151, the first selector-switch 191, the directional coupler 18, and the 3P3T switch 13. The first TX module 121 is coupled with the first antenna 141 through the second duplexer 152, the first selector-switch 191, the directional coupler 18, and the 3P3T switch 13. The second TX module 122 is coupled with the second antenna 142 through the 3P3T switch 13. The first RX module 123 has a first RX port 1231 coupled with the first antenna 141 through the first duplexer 151, the first selector-switch 191, the directional coupler 18, and the 3P3T switch 13. The first RX module 123 has a second RX port 1232 coupled with the first antenna 141 through the second selector-switch 192, the second duplexer 152, the first selector-switch 191, the directional coupler 18, and the 3P3T switch 13. The second RX port 1232 of the first RX module 123 is coupled with the second antenna 142 through the second selector-switch 192, the third duplexer 153, the second TX module 122, and the 3P3T switch 13. The first RX module 123 has a third RX port 1233 coupled with the second antenna 142 through the second TX module 122 and the 3P3T switch 13. The second RX module 124 has a first RX port 1241 coupled with the third antenna 143 through the 3P3T switch 13. The second RX module 124 has a second RX port 1242 coupled with the fourth antenna 144 through the first filtering module 16. Antenna efficiency of the first antenna 141 and the second antenna 142 is higher than that of the third antenna 143 and the fourth antenna 144.

When the RF system 100 works in a NSA mode, the first antenna 141 is used for transmission in a first LB and primary reception in the first LB, the second antenna 142 is used for transmission in a second LB and primary reception in the second LB, the third antenna 143 is used for diversity reception in the second LB, and the fourth antenna 144 is used for diversity reception in the first LB, and the first filtering module 16 is configured to filter out bands other than the first LB.

In at least one implementation, the first LB includes a first sub-band or a second sub-band and the second LB includes a third sub-band, a fourth sub-band, or a fifth sub-band.

In the case that the RF system 100 works in the NSA mode, the following illustrates an example where the first sub-band is the B20 band, the second sub-band is the B28A band, the third sub-band is the N5 band, the fourth sub-band is the N8 band, and the fifth sub-band is the N28A band. The B28A band is a part of the B28 band, which includes the B28A band and the B28B band. The N28A band is a part of N28 band, which includes the N28A band and the N28B band.

The signal flow under B20+N28A EN-DC is as follows.

TX in the B20 band: the RF transceiver 11 (for example, WTR)→the first TX module 121 (for example, MMPA)→the first duplexer 151 (for example, B20 duplexer)→the directional coupler 18→the 3P3T switch 13→the first antenna 141.

PRX in the B20 band: the first antenna 141→the 3P3T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the first filtering module 16 (for example: B20+B28 SAW)→the second RX module 124 (for example, L-DRX)→the RF transceiver 11 (for example, WTR).

TX in the N28A band: the RF transceiver 11 (for example, WTR)→the second TX module 122 (for example, LB PAMID)→the third duplexer 153 (for example, N28A duplexer)→the second TX module 122 (for example, LB PAMID)→the 3P3T switch 13→the second antenna 142.

PRX in the N28A band: the second antenna 142→the 3P3T switch 13→the second TX module 122 (for example, LB PAMID)→the third duplexer 153 (for example, N28A duplexer)→the first RX module 123 (for example, MLNA)→the RF transceiver 11 (for example, WTR).

DRX in the N28A band: the third antenna 143→the 3P3T switch 13→the second RX module 124 (for example, L-DRX)→the RF transceiver 11 (for example, WTR).

The signal flow under B20+N8 EN-DC is as follows.

TX in the B20 band: the RF transceiver 11 (for example, WTR)→the first TX module 121 (for example, MMPA)→the first duplexer 151 (for example, B20 duplexer)→the directional coupler 18→the 3P3T switch 13→the first antenna 141.

PRX in the B20 band: the first antenna 141→the 3P3T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the first filtering module 16 (for example: B20+B28 SAW)→the second RX module 124 (for example, L-DRX)→the RF transceiver 11 (for example, WTR).

TX in the N8 band: the RF transceiver 11 (for example, WTR)→the second TX module 122 (for example, LB PAMID)→the 3P3T switch 13→the second antenna 142.

PRX in the N8 band: the second antenna 142→the 3P3T switch 13→the second TX module 122 (for example, LB PAMID)→the first RX module 123 (for example, MLNA)→the RF transceiver 11 (for example, WTR).

DRX in the N8 band: the third antenna 143→the 3P3T switch 13→the second RX module 124 (for example, L-DRX)→the RF transceiver 11 (for example, WTR).

The signal flow under B28A+N5 EN-DC is as follows.

TX in the B28A band: the RF transceiver 11 (for example, WTR)→the first TX module 121 (for example, MMPA)→the second duplexer 152 (for example, B28A duplexer)→the directional coupler 18→the 3P3T switch 13→the first antenna 141.

PRX in the B28A band: the first antenna 141→the 3P3T switch 13→the directional coupler 18→the second duplexer 152 (for example, B28A duplexer)→the first RX module 123 (for example, MLNA)→the RF transceiver 11 (for example, WTR).

DRX in the B28A band: the fourth antenna 144→the first filtering module 16 (for example: B20+B28 SAW)→the second RX module 124 (for example, L-DRX)→the RF transceiver 11 (for example, WTR).

TX in the N5 band: the RF transceiver 11 (for example, WTR)→the second TX module 122 (for example, LB PAMID)→the 3P3T switch 13→the second antenna 142.

PRX in the N5 band: the second antenna 142→the 3P3T switch 13→the second TX module 122 (for example, LB PAMID)→the first RX module 123 (for example, MLNA)→the RF transceiver 11 (for example, WTR).

DRX in the N5 band: the third antenna 143→the 3P3T switch 13→the second RX module 124 (for example, L-DRX)→the RF transceiver 11 (for example, WTR).

The B20+B28 SAW can reserve the B20 and B28 bands and filter out other bands.

The directional coupler 18 of the implementation can mix two RF signals to output. In an example, the directional coupler 18 can also have a function of power allocation, which is used to divide power of an input signal into multiple ways and feed them back to corresponding RX ports of the RF transceiver 11, so that the RF transceiver 11 can adjust the power of the RF signal it transmits.

In at least one implementation, when the RF system 100 works in the 4G mode, the first antenna 141 is used for transmission in the first LB and primary reception in the first LB and is further used for transmission in the second LB and primary reception in the second LB, and the second antenna 142 is used for diversity reception in the first LB or the second LB.

When the RF system 100 works in the 4G mode, the following illustrates an example where the first sub-band is the B20 band, the second sub-band is the B28 band, the third sub-band is the B5 band, and the fourth sub-band is the B8 band.

The signal flow of the RF system 100 working in the 4G mode is as follows.

TX in the B28 band: the RF transceiver 11 (for example, WTR)→the second TX module 122 (for example, LB PAMID)→the third duplexer 153 (for example, N28A duplexer)→the second TX module 122 (for example, LB PAMID)→the 3P3T switch 13→the first antenna 141.

TX in the B5/B8/B20 band: the RF transceiver 11 (for example, WTR)→the second TX module 122 (for example, LB PAMID)→the 3P3T switch 13→the first antenna 141.

PRX in the B28 band: the first antenna 141→the 3P3T switch 13 the second TX module 122 (for example, LB PAMID)→the third duplexer 153 (for example, N28A duplexer)→the first RX module 123 (for example, MLNA)→the RF transceiver 11 (for example, WTR).

PRX in the B5/B8/B20 band: the first antenna 141→the 3P3T switch 13 the second TX module 122 (for example, LB PAMID)→the first RX module 123 (for example, MLNA)→the RF transceiver 11 (for example, WTR).

DRX in the B5/B8/B20/B28 band: the second antenna 142→the 3P3T switch 13→the second RX module 124 (for example, L-DRX)→the RF transceiver 11 (for example, WTR).

Compared with the 4P4T switch in FIG. 8*a*, the 3P3T switch in FIG. 8*b* is a mature product, which does not require additional materials for manufacture, such that stability of the switch can be ensured.

Figure 8C:
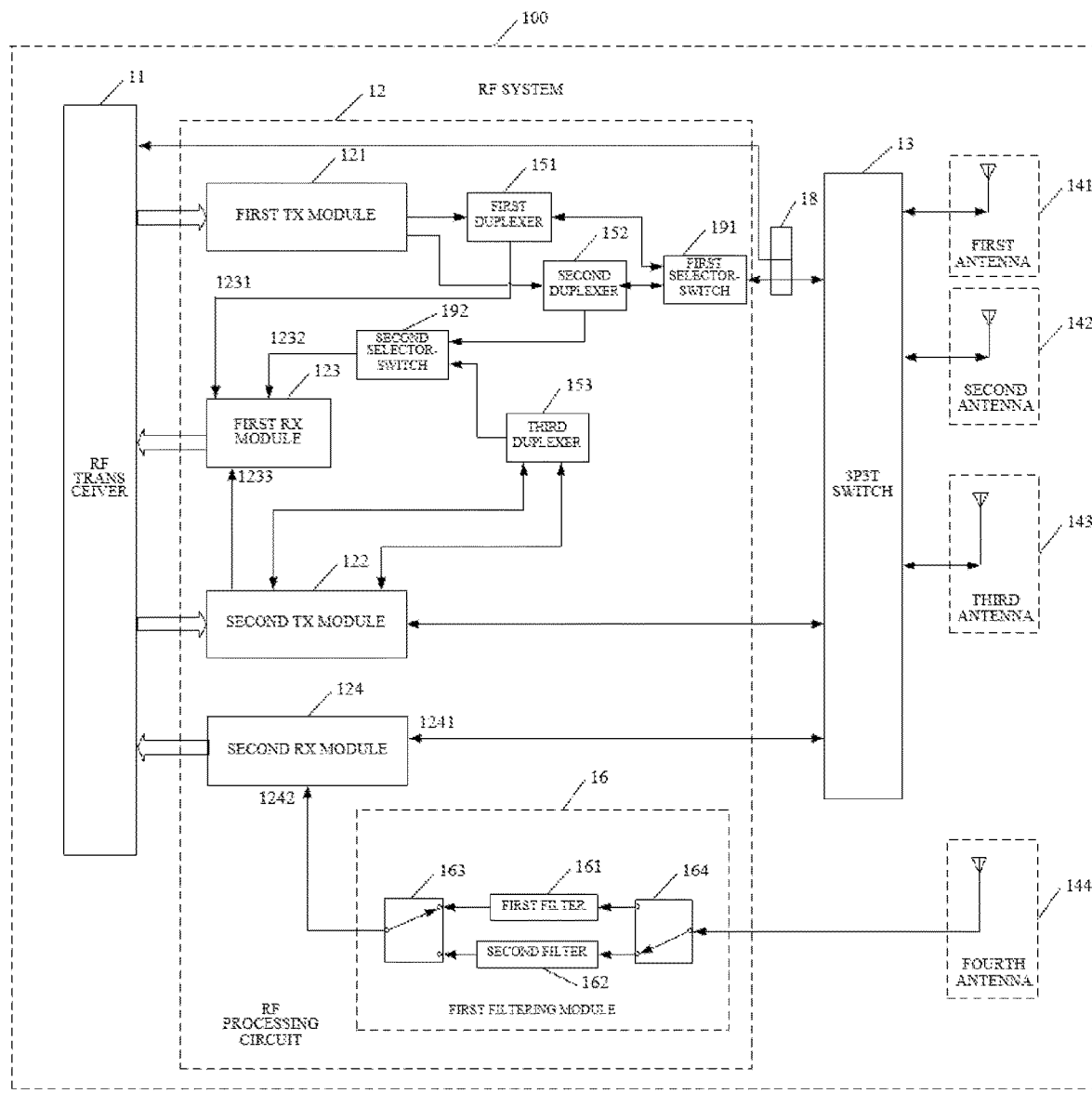
FIG. 8c is a schematic structural diagram illustrating an RF system where a transfer switch module of the RF system is a 3P3T switch according to other implementations.

FIG. 8*c* is a schematic structural diagram illustrating an RF system where a transfer switch module of the RF system is a 3P3T switch according to other implementations. As illustrated in FIG. 8*c*, the RF system 100 includes an RF transceiver 11, an RF processing circuit 12 coupled with the RF transceiver 11, a 3P3T switch 13, a first antenna 141, a second antenna 142, a third antenna 143, a fourth antenna 144, and a directional coupler 18.

The RF processing circuit 12 includes a first TX module 121, a second TX module 122, a first RX module 123, a second RX module 124, a first duplexer 151, a second duplexer 152, a third duplexer 153, a first selector-switch 191, a second selector-switch 192, and a first filtering module 16.

The first TX module 121 is coupled with the first antenna 141 through the first duplexer 151, the first selector-switch 191, the directional coupler 18, and the 3P3T switch 13. The first TX module 121 is coupled with the first antenna 141 through the second duplexer 152, the first selector-switch 191, the directional coupler 18, and the 3P3T switch 13. The second TX module 122 is coupled with the second antenna 142 through the 3P3T switch 13. The first RX module 123 has a first RX port 1231 coupled with the first antenna 141 through the first duplexer 151, the first selector-switch 191, the directional coupler 18, and the 3P3T switch 13. The first RX module 123 has a second RX port 1232 coupled with the first antenna 141 through the second selector-switch 192, the second duplexer 152, the first selector-switch 191, the directional coupler 18, and the 3P3T switch 13. The second RX port 1232 of the first RX module 123 is coupled with the second antenna 142 through the second selector-switch 192, the third duplexer 153, the second TX module 122, and the 3P3T switch 13. The first RX module 123 has a third RX port 1233 coupled with the second antenna 142 through the second TX module 122 and the 3P3T switch 13. The second RX module 124 has a first RX port 1241 coupled with the third antenna 143 through the 3P3T switch 13. The second RX module 124 has a second RX port 1242 coupled with the fourth antenna 144 through the first filtering module 16. Antenna efficiency of the first antenna 141 and the second antenna 142 is higher than that of the third antenna 143 and the fourth antenna 144.

When the RF system 100 works in a NSA mode, the first antenna 141 is used for transmission in a first LB and primary reception in the first LB, the second antenna 142 is used for transmission in a second LB and primary reception in the second LB, the third antenna 143 is used for diversity reception in the second LB, and the fourth antenna 144 is used for diversity reception in the first LB, and the first filtering module 16 is configured to filter out bands other than the first LB.

For the first filtering module 16, reference can be made to FIG. 7*b*.

The first filtering module 16 includes a first SPDT switch 163, a second SPDT switch 164, a first filter 161, and a second filter 162. The first SPDT switch 163 has a P port coupled with the second RX port 1242 of the second RX module 124. The first SPDT switch 163 has a first T port coupled with a first end of the first filter 161. The first SPDT switch 163 has a second T port coupled with a first end of the second filter 162. The first filter 161 has a second end coupled with a first T port of the second SPDT switch 164. The second filter 162 has a second end coupled with a second T port of the second SPDT switch 164. The second SPDT switch 164 has a P port coupled with the fourth antenna 144.

In at least one implementation, the first LB includes a first sub-band or a second sub-band and the second LB includes a third sub-band, a fourth sub-band, or a fifth sub-band.

In the case that the RF system 100 works in the NSA mode, the following illustrates an example where the first sub-band is the B20 band, the second sub-band is the B28A band, the third sub-band is the N5 band, the fourth sub-band is the N8 band, and the fifth sub-band is the N28A band. The B28A band is a part of the B28 band, which includes the B28A band and the B28B band. The N28A band is a part of N28 band, which includes the N28A band and the N28B band.

The signal flow under B20+N28A EN-DC is as follows.

TX in the B20 band: the RF transceiver 11 (for example, WTR)→the first TX module 121 (for example, MMPA)→the first duplexer 151 (for example, B20 duplexer)→the directional coupler 18→the 3P3T switch 13→the first antenna 141.

PRX in the B20 band: the first antenna 141→the 3P3T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the second SPDT switch 164→the first filter 161 (for example: B20 SAW)→the first SPDT switch 163→the second RX module 124 (for example, L-DRX)→the RF transceiver 11 (for example, WTR).

TX in the N28A band: the RF transceiver 11 (for example, WTR)→the second TX module 122 (for example, LB PAMID)→the third duplexer 153 (for example, N28A duplexer)→the second TX module 122 (for example, LB PAMID)→the 3P3T switch 13→the second antenna 142.

PRX in the N28A band: the second antenna 142→3P3T switch 13→the second TX module 122 (for example, LB PAMID)→the third duplexer 153 (for example, N28A duplexer)→the first RX module 123 (for example, MLNA)→the RF transceiver 11 (for example, WTR).

DRX in the N28A band: the third antenna 143→the 3P3T switch 13→the second RX module 124 (for example, L-DRX)→the RF transceiver 11 (for example, WTR).

The signal flow under B20+N8 EN-DC is as follows.

TX in the B20 band: the RF transceiver 11 (for example, WTR)→the first TX module 121 (for example, MMPA)→the first duplexer 151 (for example, B20 duplexer)→the directional coupler 18→the 3P3T switch 13→the first antenna 141.

PRX in the B20 band: the first antenna 141→the 3P3T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the second SPDT switch 164→the first filter 161 (for example: B20 SAW)→the first SPDT switch 163→the second RX module 124 (for example, L-DRX)→the RF transceiver 11 (for example, WTR).

TX in the N8 band: the RF transceiver 11 (for example, WTR)→the second TX module 122 (for example, LB PAMID)→the 3P3T switch 13→the second antenna 142.

PRX in the N8 band: the second antenna 142→the 3P3T switch 13→the second TX module 122 (for example, LB PAMID)→the first RX module 123 (for example, MLNA)→the RF transceiver 11 (for example, WTR).

DRX in the N8 band: the third antenna 143→the 3P3T switch 13→the second RX module 124 (for example, L-DRX)→the RF transceiver 11 (for example, WTR).

The signal flow under B28A+N5 EN-DC is as follows.

TX in the B28A band: the RF transceiver 11 (for example, WTR)→the first TX module 121 (for example, MMPA)→the second duplexer 152 (for example, B28A duplexer)→the directional coupler 18→the 3P3T switch 13→the first antenna 141.

PRX in the B28A band: the first antenna 141→the 3P3T switch 13→the directional coupler 18→the second duplexer 152 (for example, B28A duplexer)→the first RX module 123 (for example, MLNA)→the RF transceiver 11 (for example, WTR).

DRX in the B28A band: the fourth antenna 144→the second SPDT switch 164→the second filter 162 (for example: B28 SAW)→the first SPDT switch 163→the second RX module 124 (for example, L-DRX)→the RF transceiver 11 (for example, WTR).

TX in the N5 band: the RF transceiver 11 (for example, WTR)→the second TX module 122 (for example, LB PAMID)→the 3P3T switch 13→the second antenna 142.

PRX in the N5 band: the second antenna 142→the 3P3T switch 13→the second TX module 122 (for example, LB PAMID)→the first RX module 123 (for example, MLNA)→the RF transceiver 11 (for example, WTR).

DRX in the N5 band: the third antenna 143→the 3P3T switch 13→the second RX module 124 (for example, L-DRX)→the RF transceiver 11 (for example, WTR).

The B20 SAW can keep the B20 band and filter out other bands. The B28 SAW can reserve the B28 band and filter out other bands.

The directional coupler 18 of the implementation can mix two RF signals to output. In an example, the directional coupler 18 can also have a function of power allocation, which is used to divide power of an input signal into multiple ways and feed them back to corresponding RX ports of the RF transceiver 11, so that the RF transceiver 11 can adjust the power of the RF signal it transmits.

In at least one implementation, when the RF system 100 works in the 4G mode, the first antenna 141 is used for transmission in the first LB and primary reception in the first LB and is further used for transmission in the second LB and primary reception in the second LB, and the second antenna 142 is used for diversity reception in the first LB or the second LB.

When the RF system 100 works in the 4G mode, the following illustrates an example where the first sub-band is the B20 band, the second sub-band is the B28 band, the third sub-band is the B5 band, and the fourth sub-band is the B8 band.

The signal flow of the RF system 100 working in the 4G mode is as follows.

TX in the B28 band: the RF transceiver 11 (for example, WTR)→the second TX module 122 (for example, LB PAMID)→the third duplexer 153 (for example, N28A duplexer)→the second TX module 122 (for example, LB PAMID)→the 3P3T switch 13→the first antenna 141.

TX in the B5/B8/B20 band: the RF transceiver 11 (for example, WTR)→the second TX module 122 (for example, LB PAMID)→the 3P3T switch 13→the first antenna 141.

PRX in the B28 band: the first antenna 141→the 3P3T switch 13→the second TX module 122 (for example, LB PAMID)→the third duplexer 153 (for example, N28A duplexer)→the first RX module 123 (for example, MLNA)→the RF transceiver 11 (for example, WTR).

PRX in the B5/B8/B20 band: the first antenna 141→the 3P3T switch 13→the second TX module 122 (for example, LB PAMID)→the first RX module 123 (for example, MLNA)→the RF transceiver 11 (for example, WTR).

DRX in the B5/B8/B20/B28 band: the second antenna 142→the 3P3T switch 13→the second RX module 124 (for example, L-DRX)→the RF transceiver 11 (for example, WTR).

Figure 9:
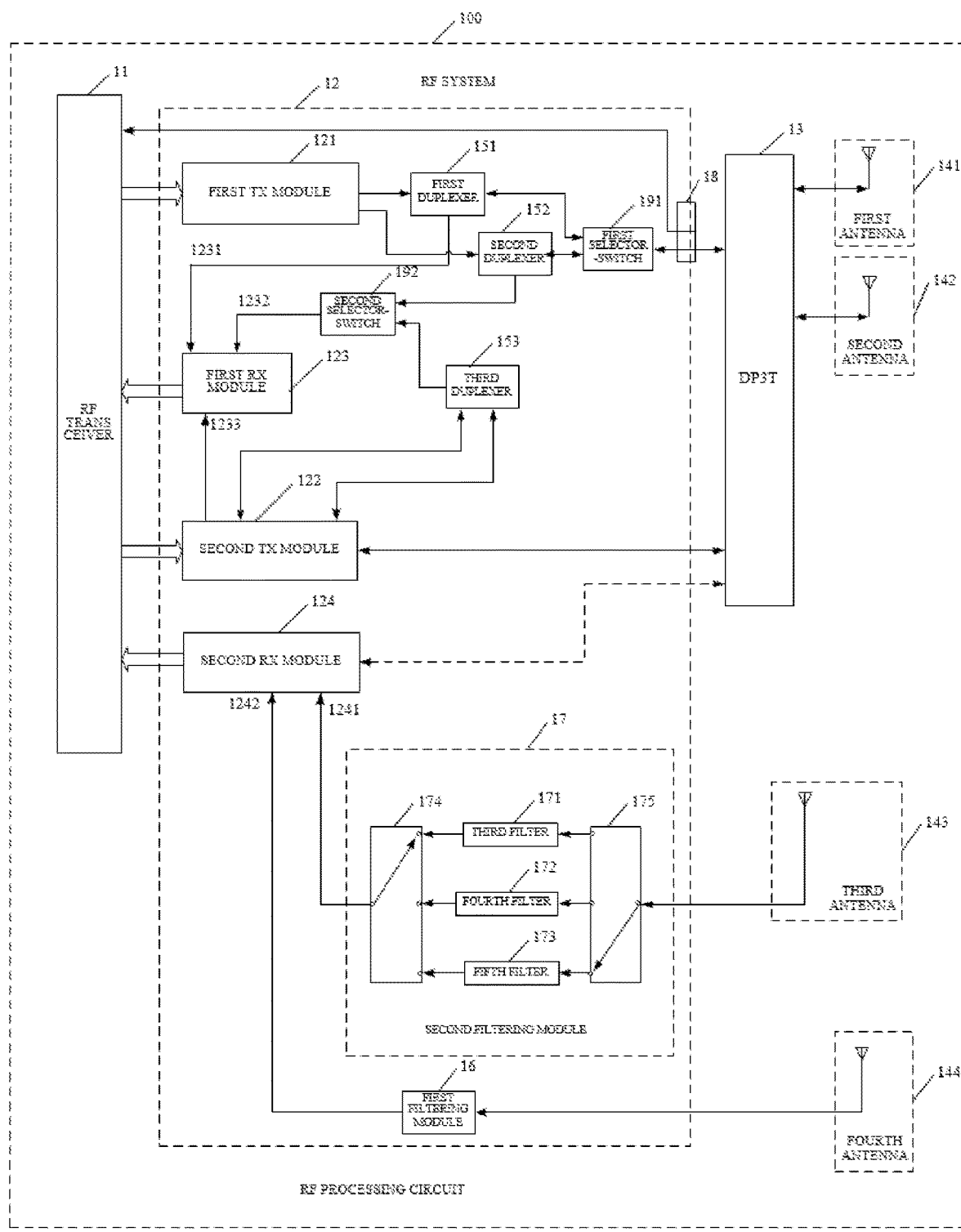
FIG. 9 is a schematic structural diagram illustrating an RF system where a transfer switch module of the RF system is a DP3T switch according to implementations.

FIG. 9 is a schematic structural diagram illustrating an RF system where a transfer switch module of the RF system is a DP3T switch according to implementations. As illustrated in FIG. 9, the RF system 100 includes an RF transceiver 11, an RF processing circuit 12 coupled with the RF transceiver 11, a DP3T switch 13, a first antenna 141, a second antenna 142, a third antenna 143, a fourth antenna 144, and a directional coupler 18.

The RF processing circuit 12 includes a first TX module 121, a second TX module 122, a first RX module 123, a second RX module 124, a first duplexer 151, a second duplexer 152, a third duplexer 153, a first selector-switch 191, a second selector-switch 192, a first filtering module 16, and a second filtering module 17.

The first TX module 121 is coupled with the first antenna 141 through the first duplexer 151, the first selector-switch 191, the directional coupler 18, and the DP3T switch 13. The first TX module 121 is coupled with the first antenna 141 through the second duplexer 152, the first selector-switch 191, the directional coupler 18, and the DP3T switch 13. The second TX module 122 is coupled with the second antenna 142 through the DP3T switch 13. The first RX module 123 has a first RX port 1231 coupled with the first antenna 141 through the first duplexer 151, the first selector-switch 191, the directional coupler 18, and the DP3T switch 13. The first RX module 123 has a second RX port 1232 coupled with the first antenna 141 through the second selector-switch 192, the second duplexer 152, the first selector-switch 191, the directional coupler 18, and the DP3T switch 13. The second RX port 1232 of the first RX module 123 is coupled with the second antenna 142 through the second selector-switch 192, the third duplexer 153, the second TX module 122, and the DP3T switch 13. The first RX module 123 has a third RX port 1233 coupled with the second antenna 142 through the second TX module 122 and the DP3T switch 13. The second RX module 124 has a first RX port 1241 coupled with the third antenna 143 through the second filtering module 17. The second RX module 124 has a second RX port 1242 coupled with the fourth antenna 144 through the first filtering module 16. Antenna efficiency of the first antenna 141 and the second antenna 142 is higher than that of the third antenna 143 and the fourth antenna 144.

When the RF system 100 works in a NSA mode, the first antenna 141 is used for transmission in a LB and primary reception in the first LB, the second antenna 142 is used for transmission in a second LB and primary reception in the second LB, the third antenna 143 is used for diversity reception in the second LB, and the fourth antenna 144 is used for diversity reception in the first LB, and the first filtering module 16 is configured to filter out bands other than the first LB.

For the second filtering module 17, reference can be made to FIG. 7a.

In at least one implementation, the first LB includes a first sub-band or a second sub-band and the second LB includes a third sub-band, a fourth sub-band, or a fifth sub-band.

In the case that the RF system 100 works in the NSA mode, the following illustrates an example where the first sub-band is the B20 band, the second sub-band is the B28A band, the third sub-band is the N5 band, the fourth sub-band is the N8 band, and the fifth sub-band is the N28A band. The B28A band is a part of the B28 band, which includes the B28A band and the B28B band. The N28A band is a part of N28 band, which includes the N28A band and the N28B band.

The signal flow under B20+N28A EN-DC is as follows.

TX in the B20 band: the RF transceiver 11 (for example, WTR)→the first TX module 121 (for example, MMPA)→the first duplexer 151 (for example, B20 duplexer)→the directional coupler 18→the DP3T switch 13→the first antenna 141.

PRX in the B20 band: the first antenna 141→the DP3T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the first filtering module 16 (for example: B20+B28 SAW)→the second RX module 124 (for example, L-DRX)→the RF transceiver 11 (for example, WTR).

TX in the N28A band: the RF transceiver 11 (for example, WTR)→the second TX module 122 (for example, LB PAMID)→the third duplexer 153 (for example, N28A duplexer)→the second TX module 122 (for example, LB PAMID)→the DP3T switch 13→the second antenna 142.

PRX in the N28A band: the second antenna 142→the DP3T switch 13→the second TX module 122 (for example, LB PAMID)→the third duplexer 153 (for example, N28A duplexer)→the first RX module 123 (for example, MLNA)→the RF transceiver 11 (for example, WTR).

DRX in the N28A band: the third antenna 143→the second SP3T switch 175→the fifth filter 173→the first SP3T switch 174→the second RX module 124 (for example, L-DRX)→the RF transceiver 11 (for example, WTR).

The signal flow under B20+N8 EN-DC is as follows.

TX in the B20 band: the RF transceiver 11 (for example, WTR)→the first TX module 121 (for example, MMPA)→the first duplexer 151 (for example, B20 duplexer)→the directional coupler 18→the DP3T switch 13→the first antenna 141.

PRX in the B20 band: the first antenna 141→the DP3T switch 13→the directional coupler 18→the first duplexer (for example, B20 duplexer)→the first RX module 123 (for example, MLNA)→the RF transceiver 11 (for example, WTR).

DRX in the B20 band: the fourth antenna 144→the first filtering module 16 (for example: B20+B28 SAW)→the second RX module 124 (for example, L-DRX)→the RF transceiver 11 (for example, WTR).

TX in the N8 band: the RF transceiver 11 (for example, WTR)→the second TX module 122 (for example, LB PAMID)→the DP3T switch 13 the second antenna 142.

PRX in the N8 band: the second antenna 142→the DP3T switch 13→the second TX module 122 (for example, LB PAMID)→the first RX module 123 (for example, MLNA)→the RF transceiver 11 (for example, WTR).

DRX in the N8 band: the third antenna 143→the second SP3T switch 175→the fourth filter 172→the first SP3T switch 174→the second RX module 124 (for example, L-DRX)→the RF transceiver 11 (for example, WTR).

The signal flow under B28A+N5 EN-DC is as follows.

TX in the B28A band: the RF transceiver 11 (for example, WTR)→the first TX module 121 (for example, MMPA)→the second duplexer 152 (for example, B28A duplexer)→the directional coupler 18→the DP3T switch 13→the first antenna 141.

PRX in the B28A band: the first antenna 141→the DP3T switch 13→the directional coupler 18→the second duplexer 152 (for example, B28A duplexer)→the first RX module 123 (for example, MLNA)→the RF transceiver 11 (for example, WTR).

DRX in the B28A band: the fourth antenna 144→the first filtering module 16 (for example: B20+B28 SAW)→the second RX module 124 (for example, L-DRX)→the RF transceiver 11 (for example, WTR).

TX in the N5 band: the RF transceiver 11 (for example, WTR)→the second TX module 122 (for example, LB PAMID)→the DP3T switch 13→the second antenna 142.

PRX in the N5 band: the second antenna 142→the DP3T switch 13→the second TX module 122 (for example, LB PAMID)→the first RX module 123 (for example, MLNA)→the RF transceiver 11 (for example, WTR).

DRX in the N5 band: the third antenna 143→the second SP3T switch 175→the third filter 171→the first SP3T switch 174→the second RX module 124 (for example, L-DRX)→the RF transceiver 11 (for example, WTR).

The B20+B28 SAW can reserve the B20 and B28 bands and filter out other bands.

The directional coupler 18 of the implementation can mix two RF signals to output. In an example, the directional coupler 18 can also have a function of power allocation, which is used to divide power of an input signal into multiple ways and feed them back to corresponding RX ports of the RF transceiver 11, so that the RF transceiver 11 can adjust the power of the RF signal it transmits.

In at least one implementation, when the RF system 100 works in the 4G mode, the first antenna 141 is used for transmission in the first LB and primary reception in the first LB and is further used for transmission in the second LB and primary reception in the second LB, and the second antenna 142 is used for diversity reception in the first LB or the second LB.

When the RF system 100 works in the 4G mode, the following illustrates an example where the first sub-band is the B20 band, the second sub-band is the B28 band, the third sub-band is the B5 band, and the fourth sub-band is the B8 band.

The signal flow of the RF system 100 working in the 4G mode is as follows.

TX in the B28 band: the RF transceiver 11 (for example, WTR)→the second TX module 122 (for example, LB PAMID)→the third duplexer 153 (for example, N28A duplexer)→the second TX module 122 (for example, LB PAMID)→the DP3T switch 13→the first antenna 141.

TX in the B5/B8/B20 band: the RF transceiver 11 (for example, WTR)→the second TX module 122 (for example, LB PAMID)→the DP3T switch 13→the first antenna 141.

PRX in the B28 band: the first antenna 141→the DP3T switch 13→the second TX module 122 (for example, LB PAMID)→the third duplexer 153 (for example, N28A duplexer)→the first RX module 123 (for example, MLNA)→the RF transceiver 11 (for example, WTR).

PRX in the B5/B8/B20 band: the first antenna 141→the DP3T switch 13→the second TX module 122 (for example, LB PAMID)→the first RX module 123 (for example, MLNA)→the RF transceiver 11 (for example, WTR).

DRX in the B5/B8/B20/B28 band: the second antenna 142→the DP3T switch 13→the second RX module 124 (for example, L-DRX)→the RF transceiver 11 (for example, WTR).

According to the solution in FIG. 9, LTE TX and NR TX can travel through the first antenna 141/the second antenna 142 by adopting the DP3T switch 13, and NR DRX and LTE DRX can travel through the third antenna 143/the fourth antenna 144, to ensure the performance of TX signals. Furthermore, it is ensured that: the first antenna 141/the second antenna 142 are used when the RF system works in the 4G mode.

In at least one implementation, the transfer switch module 13 is embodied as two transfer switches, and the two transfer switches are a first DPDT switch 131 and a second DPDT switch 132.

In at least one implementation, the first DPDT switch 131 has a first P port coupled with the first antenna 141. The first DPDT switch 131 has a second P port coupled with the second antenna 142. The first DPDT switch 131 has a first T port coupled with the first selector-switch 191. The first DPDT switch 131 has a second T port coupled with a first P port of the second DPDT switch 132. The second DPDT switch 132 has a second P port coupled with the third antenna 143. The second DPDT switch 132 has a first T port coupled with the second TX module 122. The second DPDT switch 132 has a second T port coupled with the first RX port of the second RX module 124.

The first TX module 121 is coupled with the first antenna 141 through the first duplexer 151, the first selector-switch 191, and the transfer switch module 13 as follows.

The first TX module 121 is coupled with the first antenna 141 through the first duplexer 151, the first selector-switch 191, and the first DPDT switch 131.

The first TX module 121 is coupled with the first antenna 141 through the second duplexer 152, the first selector-switch 191, and the transfer switch module 13 as follows.

The first TX module 121 is coupled with the first antenna 141 through the second duplexer 152, the first selector-switch 191, and the first DPDT switch 131.

The second TX module 122 is coupled with the second antenna 142 through the transfer switch module 13 as follows.

The second TX module 122 is coupled with the second antenna 142 through the second DPDT switch 132 and the first DPDT switch 131.

The first RX port 1231 of the first RX module 123 is coupled with the first antenna 141 through the first duplexer 151, the first selector-switch 191, and the transfer switch module 13 as follows.

The first RX port 1231 of the first RX module 123 is coupled with the first antenna 141 through the first duplexer 151, the first selector-switch 191, and the first DPDT switch 131.

The second RX port 1232 of the first RX module 123 is coupled with the first antenna 141 through the second selector-switch 192, the second duplexer 152, the first selector-switch 191, and the transfer switch module 13 as follows.

The second RX port 1232 of the first RX module 123 is coupled with the first antenna 141 through the second selector-switch 192, the second duplexer 152, the first selector-switch 191, and the first DPDT switch 131.

The second RX port 1232 of the first RX module 123 is coupled with the second antenna 142 through the second selector-switch 192, the third duplexer 153, the second TX module 122, and the transfer switch module 13 as follows.

The second RX port 1232 of the first RX module 123 is coupled with the second antenna 142 through the second selector-switch 192, the third duplexer 153, the second TX module 122, and the second DPDT switch 132.

The third RX port 1233 of the first RX module 123 is coupled with the second antenna 142 through the second TX module 122 and the transfer switch module 13 as follows.

The third RX port 1233 of the first RX module 123 is coupled with the second antenna 142 through the second TX module 122 and the second DPDT switch 132 and the first DPDT switch 131.

The first RX port 1241 of the second RX module 124 is coupled with the third antenna 143 through the transfer switch module 13 or the second filtering module as follows.

The first RX port 1241 of the second RX module 124 is coupled with the third antenna 143 through the second DPDT switch 132.

Figure 10A:
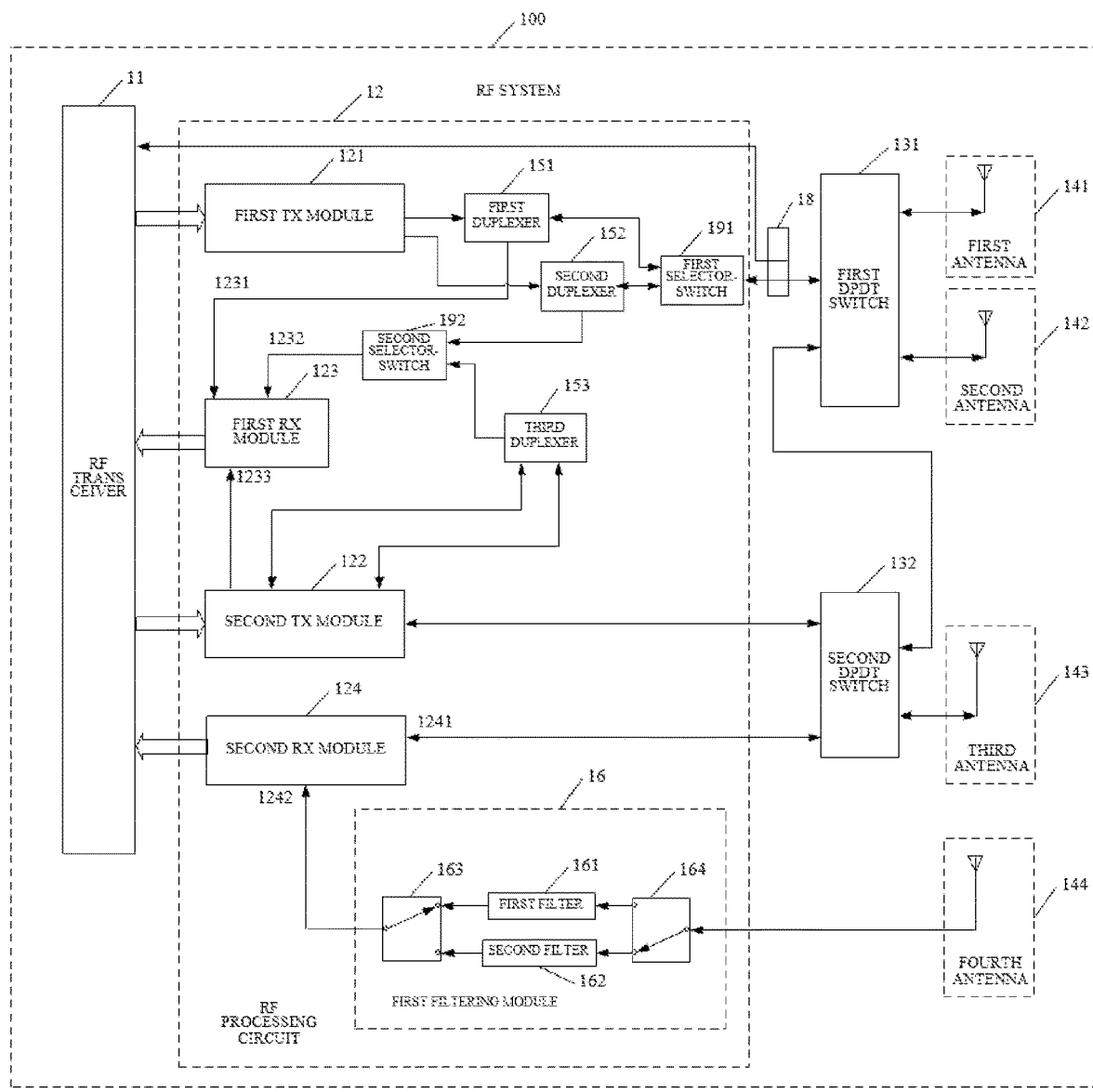
FIG. 10a is a schematic structural diagram illustrating an RF system where a transfer switch module of the RF system includes two transfer switches according to implementations.

FIG. 10*a* is a schematic structural diagram illustrating an RF system where a transfer switch module of the RF system includes two transfer switches according to implementations. As illustrated in FIG. 10*a*, the RF system 100 includes an RF transceiver 11, an RF processing circuit 12 coupled with the RF transceiver 11, a first DPDT switch 131, a second DPDT switch 132, a first antenna 141, a second antenna 142, a third antenna 143, a fourth antenna 144, and a directional coupler 18.

The RF processing circuit 12 includes a first TX module 121, a second TX module 122, a first RX module 123, a second RX module 124, a first duplexer 151, a second duplexer 152, a third duplexer 153, a first selector-switch 191, a second selector-switch 192, and a first filtering module 16.

The first TX module 121 is coupled with the first antenna 141 through the first duplexer 151, the first selector-switch 191, the directional coupler 18, and the first DPDT switch 131. The first TX module 121 is coupled with the first antenna 141 through the second duplexer 152, the first selector-switch 191, the directional coupler 18, and the first DPDT switch 131. The second TX module 122 is coupled with the second antenna 142 through the second DPDT switch 132 and the first DPDT switch 131. The first RX module 123 has a first RX port 1231 coupled with the first antenna 141 through the first duplexer 151, the first selector-switch 191, the directional coupler 18, and the first DPDT switch 131. The first RX module 123 has a second RX port 1232 coupled with the first antenna 141 through the second selector-switch 192, the second duplexer 152, the first selector-switch 191, the directional coupler 18, and the first DPDT switch 131. The second RX port 1232 of the first RX module 123 is coupled with the second antenna 142 through the second selector-switch 192, the third duplexer 153, the second TX module 122, the second DPDT switch 132, and the first DPDT switch 131. The first RX module 123 has a third RX port 1233 coupled with the second antenna 142 through the second TX module 122, the second DPDT switch 132, and the first DPDT switch 131. The second RX module 124 has a first RX port 1241 coupled with the third antenna 143 through the second DPDT switch 132. The second RX module 124 has a second RX port 1242 coupled with the fourth antenna 144 through the first filtering module 16. Antenna efficiency of the first antenna 141 and the second antenna 142 is higher than that of the third antenna 143 and the fourth antenna 144.

When the RF system 100 works in a NSA mode, the first antenna 141 is used for transmission in a LB and primary reception in the first LB, the second antenna 142 is used for transmission in a second LB and primary reception in the second LB, the third antenna 143 is used for diversity reception in the second LB, and the fourth antenna 144 is used for diversity reception in the first LB, and the first filtering module 16 is configured to filter out bands other than the first LB.

The first filtering module 16 includes a first SPDT switch 163, a second SPDT switch 164, a first filter 161, and a second filter 162. The first SPDT switch 163 has a P port coupled with the second RX port 1242 of the second RX module 124. The first SPDT switch 163 has a first T port coupled with a first end of the first filter 161. The first SPDT switch 163 has a second T port coupled with a first end of the second filter 162. The first filter 161 has a second end coupled with a first T port of the second SPDT switch 164. The second filter 162 has a second end coupled with a second T port of the second SPDT switch 164. The second SPDT switch 164 has a P port coupled with the fourth antenna 144.

In at least one implementation, the first LB includes a first sub-band or a second sub-band and the second LB includes a third sub-band, a fourth sub-band, or a fifth sub-band.

In the case that the RF system 100 works in the NSA mode, the following illustrates an example where the first sub-band is the B20 band, the second sub-band is the B28A band, the third sub-band is the N5 band, the fourth sub-band is the N8 band, and the fifth sub-band is the N28A band. The B28A band is a part of the B28 band, which includes the B28A band and the B28B band. The N28A band is a part of N28 band, which includes the N28A band and the N28B band.

The signal flow under B20+N28A EN-DC is as follows.

TX in the B20 band: the RF transceiver 11 (for example, WTR)→the first TX module 121 (for example, MMPA)→the first duplexer 151 (for example, B20 duplexer)→the directional coupler 18→the first DPDT switch 131→the first antenna 141.

PRX in the B20 band: the first antenna 141→the first DPDT switch 131→the directional coupler 18→the first duplexer (for example, B20 duplexer)→the first RX module 123 (for example, MLNA)→the RF transceiver 11 (for example, WTR).

DRX in the B20 band: the fourth antenna 144→the second SPDT switch 164→the first filter 161 (for example: B20 SAW)→the first SPDT switch 163→the second RX module 124 (for example, L-DRX)→the RF transceiver 11 (for example, WTR).

TX in the N28A band: the RF transceiver 11 (for example, WTR)→the second TX module 122 (for example, LB PAMID)→the third duplexer 153 (for example, N28A duplexer)→the second TX module 122 (for example, LB PAMID)→the second DPDT switch 132→the first DPDT switch 131→the second antenna 142.

PRX in the N28A band: the second antenna 142→the first DPDT switch 131→the second DPDT switch 132→the second TX module 122 (for example, LB PAMID)→the third duplexer 153 (for example, N28A duplexer)→the first RX module 123 (for example, MLNA)→the RF transceiver 11 (for example, WTR).

DRX in the N28A band: the third antenna 143→the second DPDT switch 132→the second RX module 124 (for example, L-DRX)→the RF transceiver 11 (for example, WTR).

The signal flow under B20+N8 EN-DC is as follows.

TX in the B20 band: the RF transceiver 11 (for example, WTR)→the first TX module 121 (for example, MMPA)→the first duplexer 151 (for example, B20 duplexer)→the directional coupler 18→the first DPDT switch 131→the first antenna 141.

PRX in the B20 band: the first antenna 141→the first DPDT switch 131→the directional coupler 18→the first duplexer (for example, B20 duplexer)→the first RX module 123 (for example, MLNA)→the RF transceiver 11 (for example, WTR).

DRX in the B20 band: the fourth antenna 144→the second SPDT switch 164→the first filter 161 (for example: B20 SAW)→the first SPDT switch 163→the second RX module 124 (for example, L-DRX)→the RF transceiver 11 (for example, WTR).

TX in the N8 band: the RF transceiver 11 (for example, WTR)→the second TX module 122 (for example, LB PAMID)→the second DPDT switch 132→the first DPDT switch 131→the second antenna 142.

PRX in the N8 band: the second antenna 142→the first DPDT switch 131→the second DPDT switch 132→the second TX module 122 (for example, LB PAMID)→the first RX module 123 (for example, MLNA)→the RF transceiver 11 (for example, WTR).

DRX in the N8 band: the third antenna 143→the second DPDT switch 132→the second RX module 124 (for example, L-DRX)→the RF transceiver 11 (for example, WTR).

The signal flow under B28A+N5 EN-DC is as follows.

TX in the B28A band: the RF transceiver 11 (for example, WTR)→the first TX module 121 (for example, MMPA)→the second duplexer 152 (for example, B28A duplexer)→the directional coupler 18→the first DPDT switch 131→the first antenna 141.

PRX in the B28A band: the first antenna 141→the first DPDT switch 131→the directional coupler 18→the second duplexer 152 (for example, B28A duplexer)→the first RX module 123 (for example, MLNA)→the RF transceiver 11 (for example, WTR).

DRX in the B28A band: the fourth antenna 144→the second SPDT switch 164→the second filter 162 (for example: B28 SAW)→the first SPDT switch 163→the second RX module 124 (for example, L-DRX)→the RF transceiver 11 (for example, WTR).

TX in the N5 band: the RF transceiver 11 (for example, WTR)→the second TX module 122 (for example, LB PAMID)→the second DPDT switch 132→the first DPDT switch 131→the second antenna 142.

PRX in the N5 band: the second antenna 142→the first DPDT switch 131→the second DPDT switch 132→the second TX module 122 (for example, LB PAMID)→the first RX module 123 (for example, MLNA)→the RF transceiver 11 (for example, WTR).

DRX in the N5 band: the third antenna 143→the second DPDT switch 132→the second RX module 124 (for example, L-DRX)→the RF transceiver 11 (for example, WTR).

The B20 SAW can keep the B20 band and filter out other bands. The B28 SAW can reserve the B28 band and filter out other bands.

The directional coupler 18 of the implementation can mix two RF signals to output. In an example, the directional coupler 18 can also have a function of power allocation, which is used to divide power of an input signal into multiple ways and feed them back to corresponding RX ports of the RF transceiver 11, so that the RF transceiver 11 can adjust the power of the RF signal it transmits.

In at least one implementation, when the RF system 100 works in the 4G mode, the first antenna 141 is used for transmission in the first LB and primary reception in the first LB and is further used for transmission in the second LB and primary reception in the second LB, and the second antenna 142 is used for diversity reception in the first LB or the second LB.

When the RF system 100 works in the 4G mode, the following illustrates an example where the first sub-band is the B20 band, the second sub-band is the B28 band, the third sub-band is the B5 band, and the fourth sub-band is the B8 band.

The signal flow of the RF system 100 working in the 4G mode is as follows.

TX in the B28 band: the RF transceiver 11 (for example, WTR)→the second TX module 122 (for example, LB PAMID)→the third duplexer 153 (for example, N28A duplexer)→the second TX module 122 (for example, LB PAMID)→the second DPDT switch 132→the first DPDT switch 131→the first antenna 141.

TX in the B5/B8/B20 band: the RF transceiver 11 (for example, WTR)→the second TX module 122 (for example, LB PAMID)→the second DPDT switch 132→the first DPDT switch 131→the first antenna 141.

PRX in the B28 band: the first antenna 141→the first DPDT switch 131→the second DPDT switch 132→the second TX module 122 (for example, LB PAMID)→the third duplexer 153 (for example, N28A duplexer)→the first RX module 123 (for example, MLNA)→the RF transceiver 11 (for example, WTR).

PRX in the B5/B8/B20 band: the first antenna 141→the first DPDT switch 131→the second DPDT switch 132→the second TX module 122 (for example, LB PAMID)→the first RX module 123 (for example, MLNA)→the RF transceiver 11 (for example, WTR).

DRX in the B5/B8/B20/B28 band: the second antenna 142→the first DPDT switch 131→the second DPDT switch 132→the second RX module 124 (for example, L-DRX)→the RF transceiver 11 (for example, WTR).

In the RF system of FIG. 10a, two DPDT switches (i.e., the first DPDT switch 131 and the second DPDT switch 132) are provided, to distribute the TX in the first LB (i.e., LTE TX) and the TX in the second LB (i.e., NR TX) to different DPDT switches, which can prevent clutter caused by cross-modulation or burning-out of one DPDT switch from affecting the other DPDT switch.

In at least one implementation, the first DPDT switch 131 has a first P port coupled with the first antenna 141. The first DPDT switch 131 has a second P port coupled with the fourth antenna 144. The first DPDT switch 131 has a first T port coupled with the first selector-switch 191. The first DPDT switch 131 has a second T port coupled with the first filtering module 16. The second DPDT switch 132 has a first P port coupled with the second antenna 142. The second DPDT switch 132 has a second P port coupled with the third antenna 143. The second DPDT switch 132 has a first T port coupled with the second TX module 122. The second DPDT switch 132 has a second T port coupled with the first RX port of the second RX module 124.

The first TX module 121 is coupled with the first antenna 141 through the first duplexer 151, the first selector-switch 191, and the transfer switch module 13 as follows.

The first TX module 121 is coupled with the first antenna 141 through the first duplexer 151, the first selector-switch 191, and the first DPDT switch 131.

The first TX module 121 is coupled with the first antenna 141 through the second duplexer 152, the first selector-switch 191, and the transfer switch module 13 as follows.

The first TX module 121 is coupled with the first antenna 141 through the second duplexer 152, the first selector-switch 191, and the first DPDT switch 131.

The second TX module 122 is coupled with the second antenna 142 through the transfer switch module 13 as follows.

The second TX module 122 is coupled with the second antenna 142 through the second DPDT switch 132.

The first RX port 1231 of the first RX module 123 is coupled with the first antenna 141 through the first duplexer 151, the first selector-switch 191, and the transfer switch module 13 as follows.

The first RX port 1231 of the first RX module 123 is coupled with the first antenna 141 through the first duplexer 151, the first selector-switch 191, and the first DPDT switch 131.

The second RX port 1232 of the first RX module 123 is coupled with the first antenna 141 through the second selector-switch 192, the second duplexer 152, the first selector-switch 191, and the transfer switch module 13 as follows.

The second RX port 1232 of the first RX module 123 is coupled with the first antenna 141 through the second selector-switch 192, the second duplexer 152, the first selector-switch 191, and the first DPDT switch 131.

The second RX port 1232 of the first RX module 123 is coupled with the second antenna 142 through the second selector-switch 192, the third duplexer 153, the second TX module 122, and the transfer switch module 13 as follows.

The second RX port 1232 of the first RX module 123 is coupled with the second antenna 142 through the second selector-switch 192, the third duplexer 153, the second TX module 122, and the second DPDT switch 132.

The third RX port 1233 of the first RX module 123 is coupled with the second antenna 142 through the second TX module 122 and the transfer switch module 13 as follows.

The third RX port 1233 of the first RX module 123 is coupled with the second antenna 142 through the second TX module 122 and the second DPDT switch 132.

The first RX port 1241 of the second RX module 124 is coupled with the third antenna 143 through the transfer switch module 13 or the second filtering module 17 as follows.

The first RX port 1241 of the second RX module 124 is coupled with the third antenna 143 through the second DPDT switch 132.

The second RX port 1242 of the second RX module 124 is coupled with the fourth antenna 144 through the first filtering module 16 as follows.

The second RX port 1242 of the second RX module 124 is coupled with the fourth antenna 144 through the first filtering module 16 and the first DPDT switch 131.

Figure 10B:
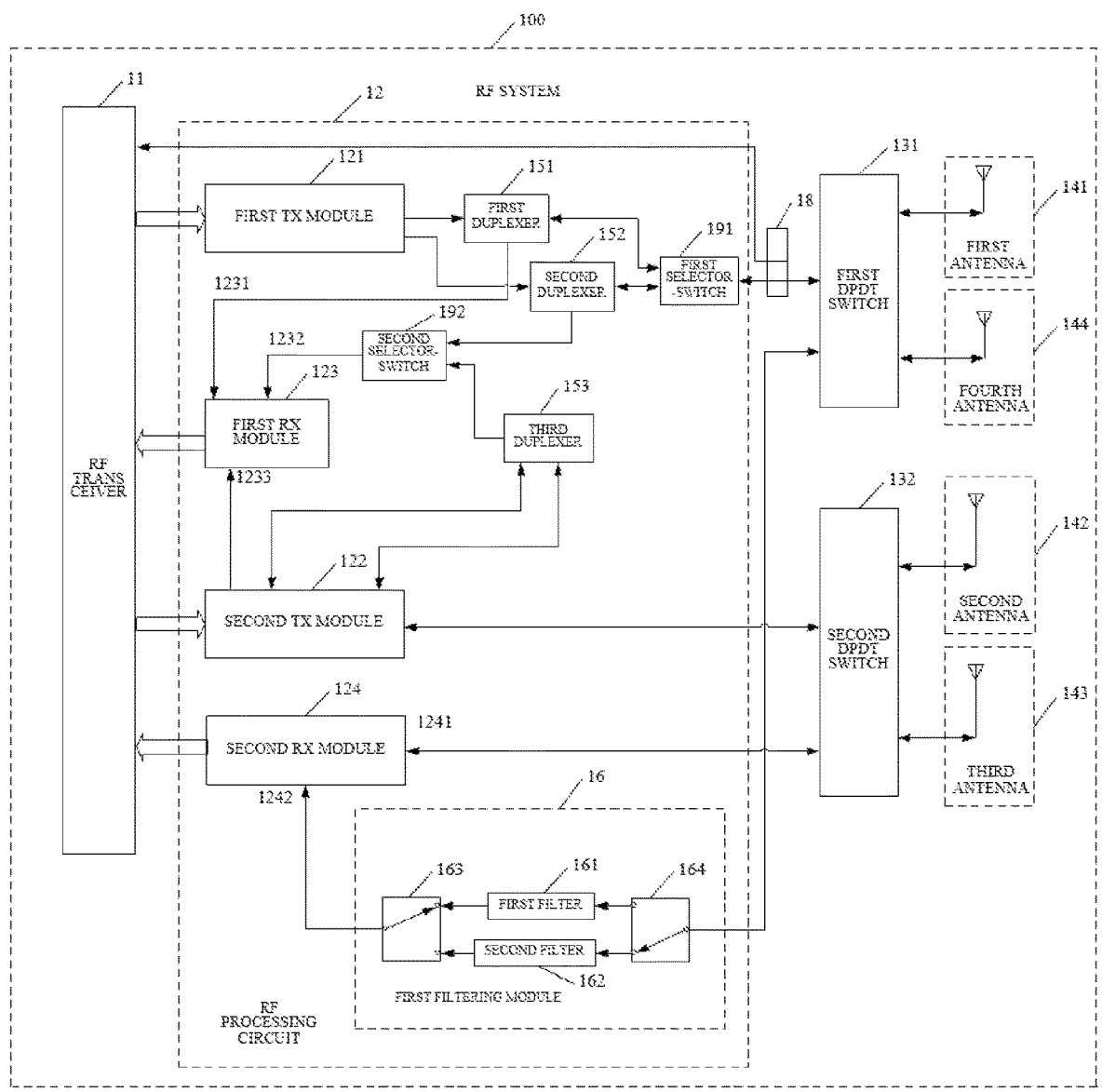
FIG. 10b is a schematic structural diagram illustrating an RF system where a transfer switch module of the RF system includes two transfer switches according to other implementations.

FIG. 10b is a schematic structural diagram illustrating an RF system where a transfer switch module of the RF system includes two transfer switches according to other implementations. As illustrated in 5b, the RF system 100 includes an RF transceiver 11, an RF processing circuit 12 coupled with the RF transceiver 11, a first DPDT switch 131, a second DPDT switch 132, a first antenna 141, a second antenna 142, a third antenna 143, a fourth antenna 144, and a directional coupler 18.

The RF processing circuit 12 includes a first TX module 121, a second TX module 122, a first RX module 123, a second RX module 124, a first duplexer 151, a second duplexer 152, a third duplexer 153, a first selector-switch 191, a second selector-switch 192, and a first filtering module 16.

The first TX module 121 is coupled with the first antenna 141 through the first duplexer 151, the first selector-switch 191, the directional coupler 18, and the first DPDT switch 131. The first TX module 121 is coupled with the first antenna 141 through the second duplexer 152, the first selector-switch 191, the directional coupler 18, and the first DPDT switch 131. The second TX module 122 is coupled with the second antenna 142 through the second DPDT switch 132. The first RX module 123 has a first RX port 1231 coupled with the first antenna 141 through the first duplexer 151, the first selector-switch 191, the directional coupler 18, and the first DPDT switch 131. The first RX module 123 has a second RX port 1232 coupled with the first antenna 141 through the second selector-switch 192, the second duplexer 152, the first selector-switch 191, the directional coupler 18, and the first DPDT switch 131. The second RX port 1232 of the first RX module 123 is coupled with the second antenna 142 through the second selector-switch 192, the third duplexer 153, the second TX module 122, and the second DPDT switch 132. The first RX module 123 has a third RX port 1233 coupled with the second antenna 142 through the second TX module 122 and the second DPDT switch 132. The second RX module 124 has a first RX port 1241 coupled with the third antenna 143 through the second DPDT switch 132. The second RX module 124 has a second RX port 1242 coupled with the fourth antenna 144 through the first filtering module 16. Antenna efficiency of the first antenna 141 and the second antenna 142 is higher than that of the third antenna 143 and the fourth antenna 144.

When the RF system 100 works in a NSA mode, the first antenna 141 is used for transmission in a LB and primary reception in the first LB, the second antenna 142 is used for transmission in a second LB and primary reception in the second LB, the third antenna 143 is used for diversity reception in the second LB, and the fourth antenna 144 is used for diversity reception in the first LB, and the first filtering module 16 is configured to filter out bands other than the first LB.

The first filtering module 16 includes a first SPDT switch 163, a second SPDT switch 164, a first filter 161, and a second filter 162. The first SPDT switch 163 has a P port coupled with the second RX port 1242 of the second RX module 124. The first SPDT switch 163 has a first T port coupled with a first end of the first filter 161. The first SPDT switch 163 has a second T port coupled with a first end of the second filter 162. The first filter 161 has a second end coupled with a first T port of the second SPDT switch 164. The second filter 162 has a second end coupled with a second T port of the second SPDT switch 164. The second SPDT switch 164 has a P port coupled with the fourth antenna 144.

In at least one implementation, the first LB includes a first sub-band or a second sub-band and the second LB includes a third sub-band, a fourth sub-band, or a fifth sub-band.

In the case that the RF system 100 works in the NSA mode, the following illustrates an example where the first sub-band is the B20 band, the second sub-band is the B28A band, the third sub-band is the N5 band, the fourth sub-band is the N8 band, and the fifth sub-band is the N28A band. The B28A band is a part of the B28 band, which includes the B28A band and the B28B band. The N28A band is a part of N28 band, which includes the N28A band and the N28B band.

The signal flow under B20+N28A EN-DC is as follows.

TX in the B20 band: the RF transceiver 11 (for example, WTR)→the first TX module 121 (for example, MMPA)→the first duplexer 151 (for example, B20 duplexer)→the directional coupler 18→the first DPDT switch 131→the first antenna 141.

PRX in the B20 band: the first antenna 141→the first DPDT switch 131→the directional coupler 18→the first duplexer (for example, B20 duplexer)→the first RX module 123 (for example, MLNA)→the RF transceiver 11 (for example, WTR).

DRX in the B20 band: the fourth antenna 144→the second SPDT switch 164→the first filter 161 (for example: B20 SAW)→the first SPDT switch 163→the second RX module 124 (for example, L-DRX)→the RF transceiver 11 (for example, WTR).

TX in the N28A band: the RF transceiver 11 (for example, WTR)→the second TX module 122 (for example, LB PAMID)→the third duplexer 153 (for example, N28A duplexer)→the second TX module 122 (for example, LB PAMID)→the second DPDT switch 132→the first DPDT switch 131→the second antenna 142.

PRX in the N28A band: the second antenna 142→the first DPDT switch 131→the second DPDT switch 132→the second TX module 122 (for example, LB PAMID)→the third duplexer 153 (for example, N28A duplexer)→the first RX module 123 (for example, MLNA)→the RF transceiver 11 (for example, WTR).

DRX in the N28A band: the third antenna 143→the second DPDT switch 132→the second RX module 124 (for example, L-DRX)→the RF transceiver 11 (for example, WTR).

The signal flow under B20+N8 EN-DC is as follows.

TX in the B20 band: the RF transceiver 11 (for example, WTR)→the first TX module 121 (for example, MMPA)→the first duplexer 151 (for example, B20 duplexer)→the directional coupler 18→the first DPDT switch 131→the first antenna 141.

PRX in the B20 band: the first antenna 141→the first DPDT switch 131→the directional coupler 18→the first duplexer (for example, B20 duplexer)→the first RX module 123 (for example, MLNA)→the RF transceiver 11 (for example, WTR).

DRX in the B20 band: the fourth antenna 144→the second SPDT switch 164→the first filter 161 (for example: B20 SAW)→the first SPDT switch 163→the second RX module 124 (for example, L-DRX)→the RF transceiver 11 (for example, WTR).

TX in the N8 band: the RF transceiver 11 (for example, WTR)→the second TX module 122 (for example, LB PAMID)→the second DPDT switch 132→the first DPDT switch 131→the second antenna 142.

PRX in the N8 band: the second antenna 142→the first DPDT switch 131→the second DPDT switch 132→the second TX module 122 (for example, LB PAMID)→the first RX module 123 (for example, MLNA)→the RF transceiver 11 (for example, WTR).

DRX in the N8 band: the third antenna 143→the second DPDT switch 132→the second RX module 124 (for example, L-DRX)→the RF transceiver 11 (for example, WTR).

The signal flow under B28A+N5 EN-DC is as follows.

TX in the B28A band: the RF transceiver 11 (for example, WTR)→the first TX module 121 (for example, MMPA)→the second duplexer 152 (for example, B28A duplexer)→the directional coupler 18→the first DPDT switch 131→the first antenna 141.

PRX in the B28A band: the first antenna 141→the first DPDT switch 131→the directional coupler 18→the second duplexer 152 (for example, B28A duplexer)→the first RX module 123 (for example, MLNA)→the RF transceiver 11 (for example, WTR).

DRX in the B28A band: the fourth antenna 144→the second SPDT switch 164→the second filter 162 (for example: B28 SAW)→the first SPDT switch 163→the second RX module 124 (for example, L-DRX)→the RF transceiver 11 (for example, WTR).

TX in the N5 band: the RF transceiver 11 (for example, WTR)→the second TX module 122 (for example, LB PAMID)→the second DPDT switch 132→the first DPDT switch 131→the second antenna 142.

PRX in the N5 band: the second antenna 142→the first DPDT switch 131→the second DPDT switch 132→the second TX module 122 (for example, LB PAMID)→the first RX module 123 (for example, MLNA)→the RF transceiver 11 (for example, WTR).

DRX in the N5 band: the third antenna 143→the second DPDT switch 132→the second RX module 124 (for example, L-DRX)→the RF transceiver 11 (for example, WTR).

The B20 SAW can keep the B20 band and filter out other bands. The B28 SAW can reserve the B28 band and filter out other bands.

The directional coupler 18 of the implementation can mix two RF signals to output. In an example, the directional coupler 18 can also have a function of power allocation, which is used to divide power of an input signal into multiple ways and feed them back to corresponding RX ports of the RF transceiver 11, so that the RF transceiver 11 can adjust the power of the RF signal it transmits.

In at least one implementation, when the RF system 100 works in the 4G mode, the first antenna 141 is used for transmission in the first LB and primary reception in the first LB and is further used for transmission in the second LB and primary reception in the second LB, and the second antenna 142 is used for diversity reception in the first LB or the second LB.

When the RF system 100 works in the 4G mode, the following illustrates an example where the first sub-band is the B20 band, the second sub-band is the B28 band, the third sub-band is the B5 band, and the fourth sub-band is the B8 band.

The signal flow of the RF system 100 working in 4G mode is as follows.

TX in the B28 band: the RF transceiver 11 (for example, WTR)→the second TX module 122 (for example, LB PAMID)→the third duplexer 153 (for example, N28A duplexer)→the second TX module 122 (for example, LB PAMID)→the second DPDT switch 132→the second antenna 142.

TX in the B5/B8/B20 band: the RF transceiver 11 (for example, WTR)→the second TX module 122 (for example, LB PAMID)→the second DPDT switch 132→the second antenna 142.

PRX in the B28 band: the second antenna 142→the second DPDT switch 132→the second TX module 122 (for example, LB PAMID)→the third duplexer 153 (for example, N28A duplexer)→the first RX module 123 (for example, MLNA)→the RF transceiver 11 (for example, WTR).

PRX in the B5/B8/B20 band: the second antenna 142→the second DPDT switch 132→the second TX module 122 (for example, LB PAMID)→the first RX module 123 (for example, MLNA)→the RF transceiver 11 (for example, WTR).

DRX in the B5/B8/B20/B28 band: the third antenna 143→the second DPDT switch 132→the second RX module 124 (for example, L-DRX)→the RF transceiver 11 (for example, WTR).

In the RF system of FIG. 10*b*, two DPDT switches (i.e., the first DPDT switch 131 and the second DPDT switch 132) are provided, to distribute the TX in the first LB (i.e., LTE TX) and the TX in the second LB (i.e., NR TX) to different DPDT switches, which can prevent clutter caused by cross-modulation or burning-out of one DPDT switch from affecting the other DPDT switch.

In an example, the first antenna 141 in FIG. 10*b* is replaced with the third antenna 143, and the second antenna 142 in FIG. 10*b* is replaced with the first antenna 141, and the third antenna 143 in FIG. 10*b* is replaced with the second antenna 142. In this case, when the RF system 100 works in the 4G mode, the first antenna 141 is used for transmission in the first LB and primary reception in the first LB and is further used for transmission in the second LB, and primary reception in the second LB and the second antenna 142 is used for diversity reception in the first LB or the second LB.

Figure 11:
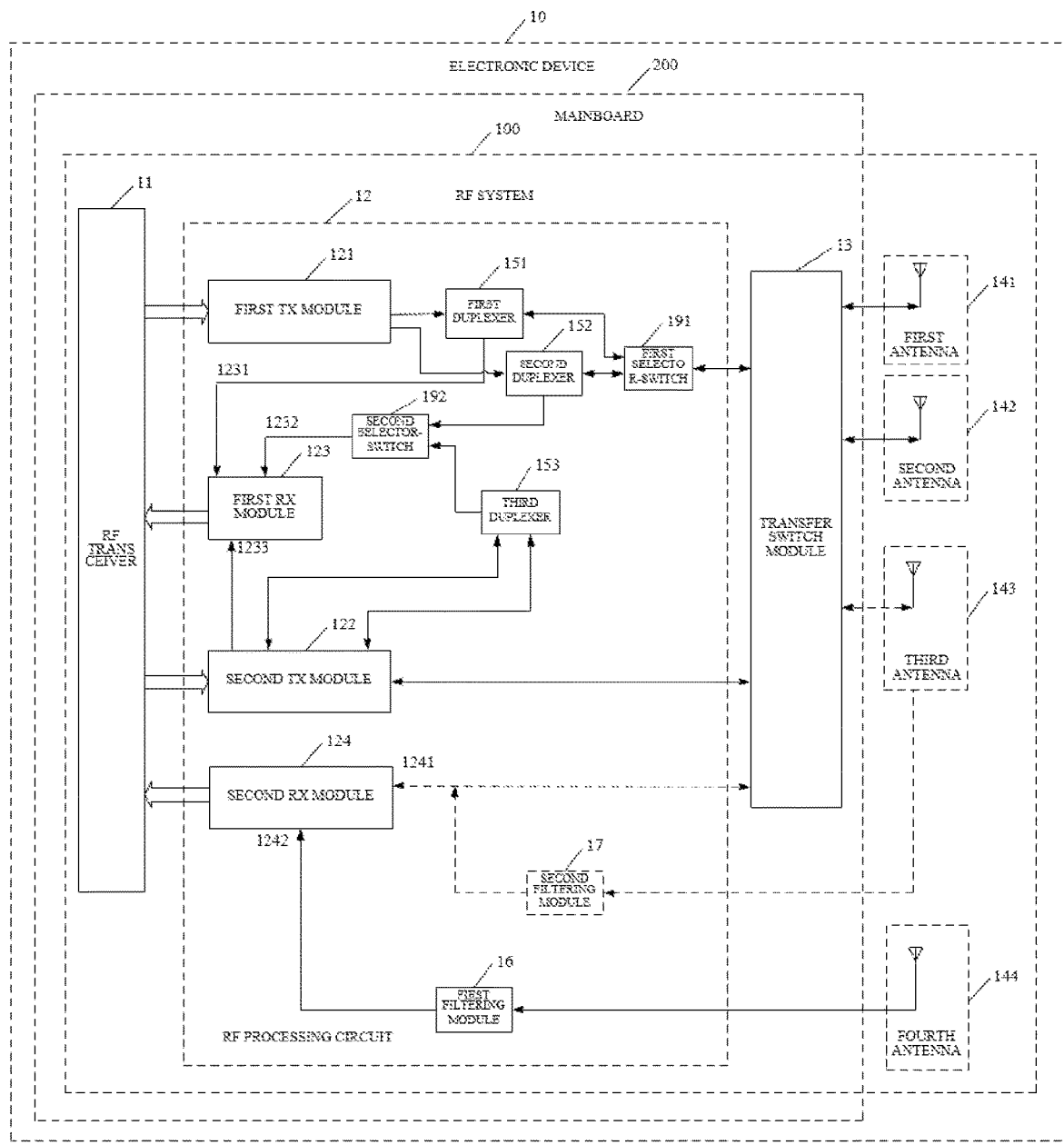
FIG. 11 is a schematic structural diagram illustrating an electronic device according to implementations.

FIG. 11 is a schematic structural diagram illustrating an electronic device according to implementations. As illustrated in FIG. 11, the electronic device 10 includes an RF system 100 described in FIG. 6, FIG. 8*a*, FIG. 8*b*, FIG. 8*c*, FIG. 9, FIGS. 10*a*, and 10*b* and a mainboard 200, where a first TX module 121, a second TX module 122, a first RX module 123, a second RX module 124, a first duplexer 151, a second duplexer 152, and a first filtering module 16 of the RF system 100 can be disposed on the mainboard 200. When the RF system 100 works in a NSA mode, the RF system 100 is configured to implement transmission and reception in a first LB and transmission and reception in a second LB.

The above is the implementation manners of the implementations of this application. It should be noted that for those of ordinary skill in the art, without departing from the principles of the implementations of this application, several improvements and modifications can be made. However, these improvements and modifications shall fall within the protection scope of this application.

What is claimed is:

1. A radio frequency (RF) system, comprising an RF transceiver, an RF processing circuit coupled with the RF transceiver, a transfer switch module, a first antenna, a second antenna, a third antenna, and a fourth antenna, wherein the RF processing circuit comprises a first transmit (TX) module, a second TX module, a first receive (RX) module, a second RX module, a first duplexer, a second duplexer, and a filtering module;

the first TX module is coupled with the transfer switch module through the first duplexer, the second TX module is coupled with the transfer switch module, the first RX module has a first RX port coupled with the transfer switch module through the first duplexer, the first RX module has a second RX port coupled with the transfer switch module through the second duplexer and the second TX module, the first RX module has a third RX port coupled with the transfer switch module through the second TX module, the second RX module has a first RX port coupled with the transfer switch module, the second RX module has a second RX port coupled with the filtering module or coupled with the transfer switch module through the filtering module;

the first antenna and the second antenna are coupled with the transfer switch module, the third antenna is coupled with the transfer switch module or the filtering module, and the fourth antenna is coupled with the transfer switch module or the filtering module, wherein antenna efficiency of the first antenna and the second antenna is higher than that of the third antenna and the fourth antenna; and the first antenna is used for transmission in a first low-band (LB) and primary reception in the first LB, the second antenna is used for transmission in a second LB and primary reception in the second LB, the third antenna is used for diversity reception in the second LB, the fourth antenna is used for diversity reception in the first LB, and the filtering module is configured to filter out bands other than the first LB, when the RF system works in a non-standalone (NSA) mode.

2. The RF system of claim 1, wherein the first antenna is used for transmission in the first LB and primary reception in the first LB and is further used for transmission in the second LB and primary reception in the second LB and the second antenna is used for diversity reception in the first LB or the second LB, when the RF system works in a fourth-generation (4G) mode.

3. The RF system of claim 1, wherein the second LB comprises a first sub-band or a second sub-band.

4. The RF system of claim 3, wherein the transfer switch module comprises one transfer switch and the transfer switch comprises a dual-pole triple-throw (DP3T) switch, a triple-pole triple-throw (3P3T) switch, or a dual-pole quad-throw (DP4T) switch.

5. The RF system of claim 4, wherein when the transfer switch comprises the DP3T switch or the DP4T switch, the filtering module comprises a first filtering module and a second filtering module and the second RX module has a third RX port coupled with the second filtering module.

6. The RF system of claim 5, wherein the first filtering module comprises a first filter and the second filtering module comprises a second filter, a third filter, a first single-pole double-throw (SPDT) switch, and a second SPDT switch, wherein the first SPDT switch has a P port coupled with the third RX port of the second RX module, the first SPDT switch has a first T port coupled with a first end of the second filter, the first SPDT switch has a second T port coupled with a first end of the third filter, the second filter has a second end coupled with a first T port of the second SPDT switch, the third filter has a second end coupled with a second T port of the second SPDT switch, and the second SPDT switch has a P port coupled with the third antenna; and the second filter is configured to filter out bands other than the first sub-band and the third filter is configured to filter out bands other than the second sub-band.

7. The RF system of claim 4, wherein when the transfer switch comprises the 3P3T switch, the filtering module comprises a first filtering module and the third antenna is coupled with the transfer switch module.

8. The RF system of claim 3, wherein the filtering module comprises a first filtering module, the transfer switch module comprises two transfer switches, and the two transfer switches comprise a first dual-pole double-throw (DPDT) switch and a second DPDT switch.

9. The RF system of claim 8, wherein the first DPDT switch has a first P port coupled with the first antenna, the first DPDT switch has a second P port coupled with the third antenna, the first DPDT switch has a first T port coupled with the first duplexer, the first DPDT switch has a second T port coupled with a first P port of the second DPDT switch, the second DPDT switch has a second P port coupled with the second antenna, the second DPDT switch has a first T port coupled with the second TX module, and the second DPDT switch has a second T port coupled with the first RX port of the second RX module, wherein the first TX module is coupled with the first DPDT switch through the first duplexer;

the second TX module is coupled with the second DPDT switch;

the first RX port of the first RX module is coupled with the first DPDT switch through the first duplexer;

the second RX port of the first RX module is coupled with the second DPDT switch through the second duplexer and the second TX module;

the third RX port of the first RX module is coupled with the second DPDT switch through the second TX module;

the first RX port of the second RX module is coupled with the second DPDT switch; and the second RX port of the second RX module is coupled with the first filtering module.

10. The RF system of claim 8, wherein the first DPDT switch has a first P port coupled with the second antenna, the first DPDT switch has a second P port coupled with the third antenna, the first DPDT switch has a first T port coupled with the second TX module, the first DPDT switch has a second T port coupled with the first RX port of the second RX module, the second DPDT switch has a first P port coupled with the first antenna, the second DPDT switch has a second P port coupled with the fourth antenna, the second DPDT switch has a first T port coupled with the first duplexer, and the second DPDT switch has a second T port coupled with the first filtering module, wherein the first TX module is coupled with the second DPDT switch through the first duplexer;

the second TX module is coupled with the first DPDT switch;

the first RX port of the first RX module is coupled with the second DPDT switch through the first duplexer;

the second RX port of the first RX module is coupled with the first DPDT switch through the second duplexer and the second TX module;

the third RX port of the first RX module is coupled with the first DPDT switch through the second TX module;

the first RX port of the second RX module is coupled with the first DPDT switch; and the second RX port of the second RX module is coupled with the second DPDT switch through the first filtering module.

11. The RF system of claim 1, further comprising a third duplexer, a first selector-switch, and a second selector-switch, wherein the first TX module is coupled with the transfer switch module through the first duplexer and the first selector-switch or coupled with the transfer switch module through the second duplexer and the first selector-switch, the first RX port of the first RX module is coupled with the transfer switch module through the first duplexer and the first selector-switch, and the second RX port of the first RX module is coupled with the transfer switch module through the second selector-switch, the second duplexer, and the first selector-switch or coupled with the transfer switch module through the second selector-switch, the third duplexer, the second TX module.

12. The RF system of claim 11, wherein the first antenna is used for transmission in the first LB and primary reception in the first LB and is further used for transmission in the second LB and primary reception in the second LB, the second antenna is used for diversity reception in the first LB or the second LB, when the RF system works in a 4G mode.

13. The RF system of claim 11, wherein the first LB comprises a first sub-band or a second sub-band and the second LB comprises a third sub-band, a fourth sub-band, or a fifth sub-band.

14. The RF system of claim 13, wherein the transfer switch module comprises one transfer switch and the transfer switch comprises a DP3T switch, a 3P3T switch, or a quad-pole quad-throw (4P4T) switch.

15. The RF system of claim 14, wherein when the transfer switch comprises the DP3T switch, the filtering module comprises a first filtering module and a second filtering module and the first RX port of the second RX module is further coupled with the second filtering module.

16. The RF system of claim 15, wherein the second filtering module comprises a third filter, a fourth filter, a fifth filter, a first single-pole triple-throw (SP3T) switch, and a second SP3T switch, wherein
the first SP3T switch has a P port coupled with the first RX port of the second RX module, the first SP3T switch has a first T port coupled with a first end of the third filter, the first SP3T switch has a second T port coupled with a first end of the fourth filter, the first SP3T switch has a third T port coupled with a first end of the fifth filter, the third filter has a second end coupled with a first T port of the second SP3T switch, the fourth filter has a second end coupled with a second T port of the second SP3T switch, the fifth filter has a second end coupled with a third T port of the second SP3T switch, and the second SP3T switch has a P port coupled with the third antenna; and
the third filter is configured to filter out bands other than the third sub-band, the fourth filter is configured to filter out bands other than the fourth sub-band, and the fifth filter is configured to filter out bands other than the fifth sub-band.

17. The RF system of claim 14, wherein when the transfer switch comprises the 3P3T switch or the 4P4T switch, the filtering module comprises a first filtering module and the third antenna is coupled with the transfer switch module.

18. The RF system of claim 13, wherein the filtering module comprises a first filtering module, the transfer switch module comprises two transfer switches, and the two transfer switches comprise a first DPDT switch and a second DPDT switch.

19. The RF system of claim 17, wherein the first filtering module comprises a first SPDT switch, a second SPDT switch, a first filter, and a second filter, wherein
the first SPDT switch has a P port coupled with the second RX port of the second RX module, the first SPDT switch has a first T port coupled with a first end of the first filter, the first SPDT switch has a second T port coupled with a first end of the second filter, the first filter has a second end coupled with a first T port of the second SPDT switch, the second filter has a second end coupled with a second T port of the second SPDT switch, and the second SPDT switch has a P port coupled with the fourth antenna; and
the first filter is configured to filter out bands other than the first sub-band, and the second filter is configured to filter out bands other than the second sub-band.

20. An electronic device comprising a radio frequency (RF) system and a mainboard, the RF system comprising an RF transceiver, an RF processing circuit coupled with the RF transceiver, a transfer switch module, a first antenna, a second antenna, a third antenna, and a fourth antenna, wherein
the RF transceiver, the RF processing circuit, and the transfer switch module are disposed on the mainboard;
the RF processing circuit comprises a first transmit (TX) module, a second TX module, a first receive (RX) module, a second RX module, a first duplexer, a second duplexer, and a filtering module;
the first TX module is coupled with the transfer switch module through the first duplexer, the second TX module is coupled with the transfer switch module, the first RX module has a first RX port coupled with the transfer switch module through the first duplexer, the first RX module has a second RX port coupled with the transfer switch module through the second duplexer and the second TX module, the first RX module has a third RX port coupled with the transfer switch module through the second TX module, the second RX module has a first RX port coupled with the transfer switch module, the second RX module has a second RX port coupled with the filtering module or coupled with the transfer switch module through the filtering module;
the first antenna and the second antenna are coupled with the transfer switch module, the third antenna is coupled with the transfer switch module or the filtering module, and the fourth antenna is coupled with the transfer switch module or the filtering module, wherein antenna efficiency of the first antenna and the second antenna is higher than that of the third antenna and the fourth antenna; and
the first antenna is used for transmission in a first low-band (LB) and primary reception in the first LB, the second antenna is used for transmission in a second LB and primary reception in the second LB, the third antenna is used for diversity reception in the second LB, the fourth antenna is used for diversity reception in the first LB, and the filtering module is configured to filter out bands other than the first LB, when the RF system works in a non-standalone (NSA) mode; and
the RF system is configured to implement transmission and reception in the first LB and transmission and reception in the second LB when the RF system works in the NSA mode.

* * * * *